US008736741B2

(12) United States Patent
Kunishige et al.

(10) Patent No.: US 8,736,741 B2
(45) Date of Patent: May 27, 2014

(54) IMAGING DEVICE WITH CONTRAST AF, AND CONTROL METHOD FOR IMAGING DEVICE WITH CONTRAST AF

(71) Applicant: Olympus Imaging Corp., Tokyo (JP)

(72) Inventors: Keiji Kunishige, Hachioji (JP); Satoshi Miyazaki, Tokyo (JP)

(73) Assignee: Olympus Imaging Corp., Tokyo (JP)

( * ) Notice: Subject to any disclaimer, the term of this patent is extended or adjusted under 35 U.S.C. 154(b) by 0 days.

(21) Appl. No.: 13/782,870

(22) Filed: Mar. 1, 2013

(65) Prior Publication Data
US 2013/0176475 A1  Jul. 11, 2013

Related U.S. Application Data

(62) Division of application No. 12/205,378, filed on Sep. 5, 2008, now Pat. No. 8,405,759.

(30) Foreign Application Priority Data

Sep. 27, 2007  (JP) ................................. 2007-252354
Sep. 27, 2007  (JP) ................................. 2007-252355
Sep. 27, 2007  (JP) ................................. 2007-252356

(51) Int. Cl.
*H04N 5/232*  (2006.01)
*H04N 5/228*  (2006.01)

(52) U.S. Cl.
USPC ................. 348/345; 348/333.01; 348/208.12; 348/373

(58) Field of Classification Search
USPC ............ 348/208.12, 211.9, 294, 333.01, 345, 348/347, 373, 374, 358
See application file for complete search history.

(56) References Cited

U.S. PATENT DOCUMENTS

| 6,972,799 | B1 * | 12/2005 | Hashimoto | .................... 348/350 |
| 2003/0231291 | A1 * | 12/2003 | Kitajima et al. | ................. 355/56 |
| 2005/0062872 | A1 * | 3/2005 | Nakashima et al. | .......... 348/349 |
| 2005/0068455 | A1 * | 3/2005 | Hatano | ......................... 348/345 |
| 2009/0027539 | A1 * | 1/2009 | Kunou | ..................... 348/333.01 |
| 2011/0085784 | A1 * | 4/2011 | Imamura | ......................... 396/55 |

* cited by examiner

*Primary Examiner* — Hung Lam
(74) *Attorney, Agent, or Firm* — John C. Pokotylo; Straub & Pokotylo

(57) ABSTRACT

According to the present invention, there is provided an imaging device, comprising: an imaging unit for receiving subject light flux, that has been made incident by the photographing lens, on an imaging surface, and photoelectrically converting a formed subject image to output image data; a display unit for carrying out a live view display operation using image data acquired by the imaging unit; a first contrast AF unit for obtaining contrast information of the subject information from image data acquired by the imaging unit and guiding the photographing lens into a first in-focus permissible range based on the contrast information, and a control unit for, when the live view display operation has started, executing a focus adjustment operation using the first contrast AF unit at a first time interval.

5 Claims, 20 Drawing Sheets

AF mode setting menu display screen image sensor light receiving surface liquid crystal monitor screen _# IMAGING DEVICE WITH CONTRAST AF, AND CONTROL METHOD FOR IMAGING DEVICE WITH CONTRAST AF This application is a divisional of U.S. patent application Ser. No. 12/205,378 (referred to as "the '378 application" and incorporated herein by reference), filed on Sep. 5, 2008, titled "IMAGING DEVICE WITH CONTRAST AF, AND CONTROL METHOD FOR IMAGING DEVICE WITH CONTRAST AF," and listing Keiji KUNISHIGE and Satoshi MIYAZAKI, as the inventors, the '378 application being based upon and claiming benefit under 35 U.S.C. §119, to the filing date of prior Japanese Patent Application Nos. 2007-252354 filed on Sep. 27, 2007, 2007-252355 filed on Sep. 27, 2007, and 2007-252356 filed on Sep. 27, 2007. The entire contents of the '378 application and the foregoing Japanese patent applications are incorporated herein by reference.

BACKGROUND OF THE INVENTION

1. Field of the Invention

The present invention relates to an imaging device having a live view display function, and to a control method for the imaging device, and in detail relates to an imaging device, having a so-called live view display function (also called an electronic viewfinder function) for displaying an image acquired by an image sensor on a display unit, capable of focusing a photographing lens using an image signal during this live view display, and to a control method for an imaging device.

2. Description of the Related Art

In a conventional digital camera, observation of a subject image is performed using an optical viewfinder. Recently however, digital camera are available on the market that do not have an optical viewfinder, or as well as the optical viewfinder have a live view display function for displaying an image that has been acquired by an image sensor using a display device such as a liquid crystal monitor for subject observation.

A digital camera having this type of live view display function is useful in making subject observation easy because a subject image acquired by the image sensor is displayed directly. However, in a digital single lens reflex camera, in order to carry out live view display a movable mirror that is arranged in the imaging optical path is temporarily retracted, which means that during live view it is no longer possible to use an AF (Auto Focus) mechanism that employs a conventional phase difference method where an amount of defocus of the photographing lens is detected using subject light flux that has been reflected by a sub-mirror attached to the moveable mirror.

For example, a digital single lens reflex camera that uses both contrast AF for performing AF by detecting contrast information based on an image signal from an image sensor, and the phase difference method AF, is disclosed in Japanese unexamined patent application No. 2006-163094 (laid-open Jun. 22, 2006). With this digital single lens reflex camera, focusing of the photographing lens is carried out using contrast. AF once at the time of performing live view display, in response to an operation of pressing the release button down half way.

SUMMARY OF THE INVENTION

The present invention has as its object to provide an imaging device that can perform focusing with a small time lag and with high precision in the case of imaging from a live view display function, and a control method for an imaging device.

According to the present invention, there is provided an imaging device, comprising: an imaging unit for receiving subject light flux, that has been made incident by the photographing lens, on an imaging surface, and photoelectrically converting a formed subject image to output image data; a display unit for carrying out a live view display operation using image data acquired by the imaging unit; a first contrast AF unit for obtaining contrast information of the subject information from image data acquired by the imaging unit and guiding the photographing lens into a first in-focus permissible range based on the contrast information, and a control unit for, when the live view display operation has started, executing a focus adjustment operation using the first contrast AF unit at a first time interval.

Also, a control method for an imaging device of the present invention comprises the steps of: imaging a subject, performing live view display of the imaged subject, and guiding a photographing lens to a first in-focus permissible range based on contrast information of the subject image at a first time interval if the live view display operation has started.

DETAILED DESCRIPTION OF THE PREFERRED EMBODIMENTS

Figure 1:
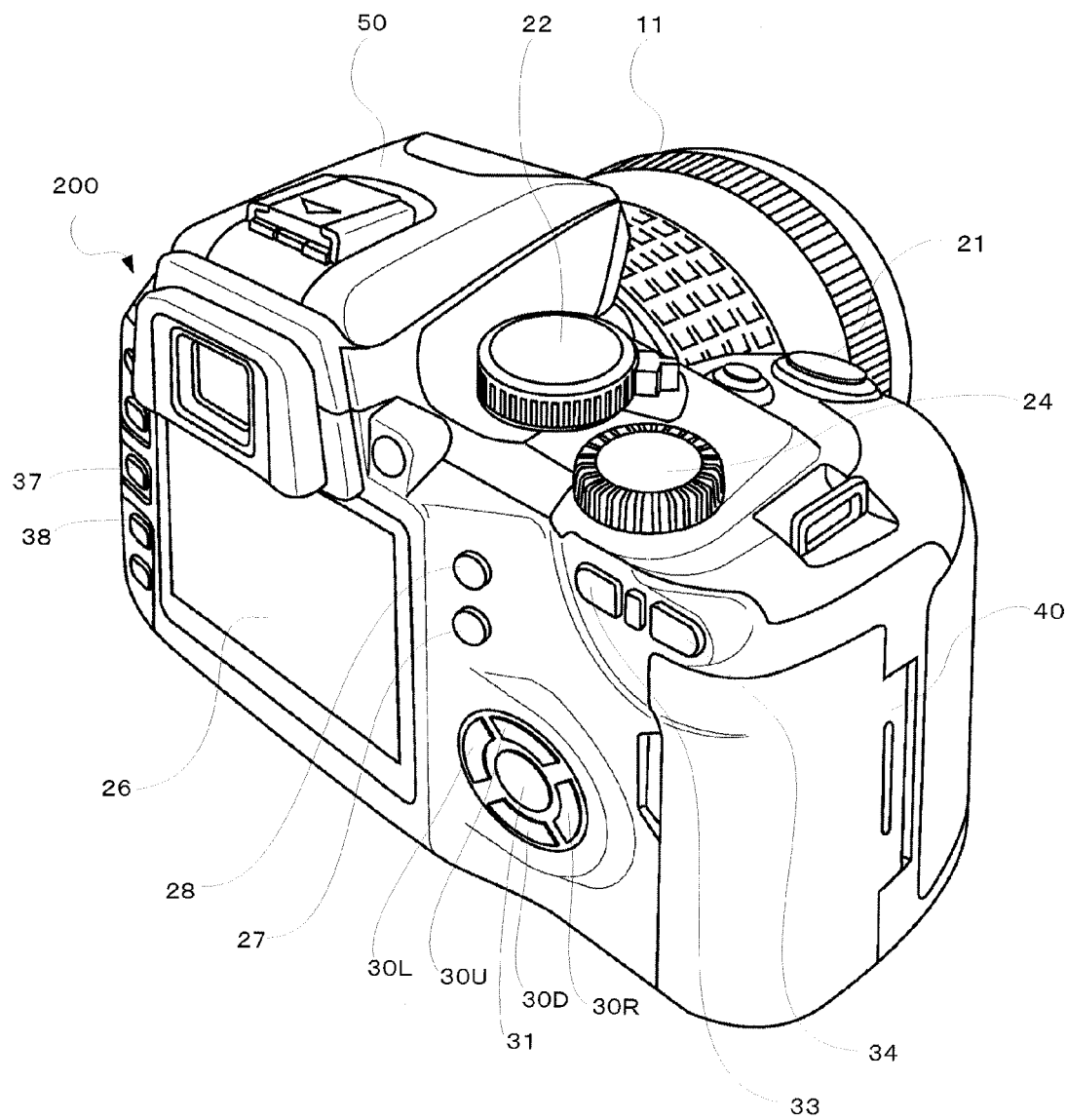
FIG. 1 is an external perspective drawing looking at a digital single lens reflex camera of a first embodiment of the present invention from a rear surface.

In the following, preferred embodiments using a digital, single lens reflex adopting the present invention will be described using the drawings. FIG. 1 is an external perspective drawing of a digital single lens reflex camera relating to a first embodiment of the present invention seen from a rear surface.

A release button 21, exposure mode dial 22, information setting dial 24 and strobe 50 etc. are arranged on the upper surface of the camera body 200. The release button 21 has a first release switch that turns on if the photographer presses the button down halfway, and a second release switch that is turned on when the button is pressed down fully. By turning this first release switch (hereafter called 1R) on (photographing preparation operation), the camera carries out exposure preparation operations such as focal point detection, focusing of the photographing lens, and light measurements for the subject brightness, and by turning the second switch (hereafter called 2R) on (photographing operation), a shooting operation is carried out to acquire image data for a subject image based on output of the image sensor 221 (refer to FIG. 2).

The exposure mode dial 22 is an operation member constructed capable of rotation, and by aligning a pictorial display or symbol representing an exposure mode provided on the exposure mode dial 22 with an index, it is possible to select respective exposure modes, such as full auto exposure mode (AUTO), program exposure mode (P), aperture priority exposure mode (A), shutter priority exposure mode (S), manual exposure mode (M), portrait exposure mode, landscape exposure mode, macro exposure mode, sports exposure mode or night scene exposure mode.

An information setting dial 24 is an operation member constructed capable of rotation, and it is possible to select desired setting values and modes etc. in an information display screen or the like by rotational operation of the information setting dial 24. The strobe 50 is a pop-up type supplemental lighting unit, and by operating an operating button, not shown, the strobe 50 pops up and is capable of irradiating light to a subject.

A liquid crystal monitor 26, continuous/single shot button 22, AF lock button 28, a cross-shaped button for up 30U, a cross-shaped button for down 30D, a cross-shaped button for right 30R, a cross-shaped button for left 30L, (if these buttons 30U, 30D, 30R and 30L are referred to collectively, it will be called a cross-shaped button 30), an OK button 31, a live view display button 33, an enlarge button 34, a menu button 37 and a playback button 38 are arranged on the rear surface of the camera body 200. The liquid crystal monitor 26 is a display unit for carrying out live view display, playback display of subject images that have already been taken, and display of exposure information and menus. The display device is not limited to a liquid crystal display as long as it is possible to perform these display operations.

The continuous/single shot button 27 is an operation member switching between continuous shooting mode where pictures are taken continuously while the release button 21 is fully pressed down, and single shot mode where a single picture is taken if the release button 21 is pressed down fully. The AF lock button is an operation member for fixing the focus point of the subject. Accordingly, if the subject of a picture to be taken is focused on, and the AF lock button 28 is operated in this state and the focus point fixed, it is possible take a picture with the subject still in focus, even if the composition is changed.

The cross-shaped key 30 is an operation member for instructing movement of a cursor in two dimensional directions, the X direction and Y direction, on the liquid crystal display monitor 26, and is also used in selection commands for subject image, when performing playback display of subject images that have been stored in the storage medium 277 (refer to FIG. 2) etc. Besides providing the four buttons for up, down left and right, it is also possible to replace with a touch switch. The OK button 31 is an operation member for confirming various items selected by the cross key button 30 and the control dial 24 etc.

The live view display button 33 is an operating button for switching to live view display from a display screen for, information display etc., and switching from live view display to a display screen for information display etc. Live view display is a mode that display a subject image for viewing on the liquid crystal monitor 26 based on output of the image sensor 221 for subject image storage, and information display is a mode for displaying digital camera exposure information on the liquid crystal monitor 26. The enlargement button 34 is an operation member for enlarging display of part of a subject image on the liquid crystal monitor 26, and it is possible to change the enlargement position by operation of the above-described cross-shaped key 30.

The menu button 37 is an operation member for switching to menu mode in order to set various modes of the digital camera, such as AF-mode etc., and if menu mode is selected by operation of this button 37 a menu screen is displayed on the liquid crystal monitor 26. The menu screen is comprised of a multiple hierarchical structure, and various items are selected using the cross key 30 and selection is determined by operating the OK button 31.

The playback button 38 is an operation button for instructing display of subject images, that have been stored after being taken, on the liquid crystal monitor 26. If a command for playback display is issued, image data of subjects stored in a compressed mode such as JPEG, for example, in SDRAM 267 and a storage medium 277, that will be described later, is expanded.

A storage medium housing cover 40 is attached to the side surface of the camera body 200. If the storage medium cover 40 is opened, a slot for fitting the storage medium 227 is provided inside, and the storage medium 227 can be loaded into or removed from the camera body 200.

Figure 2:
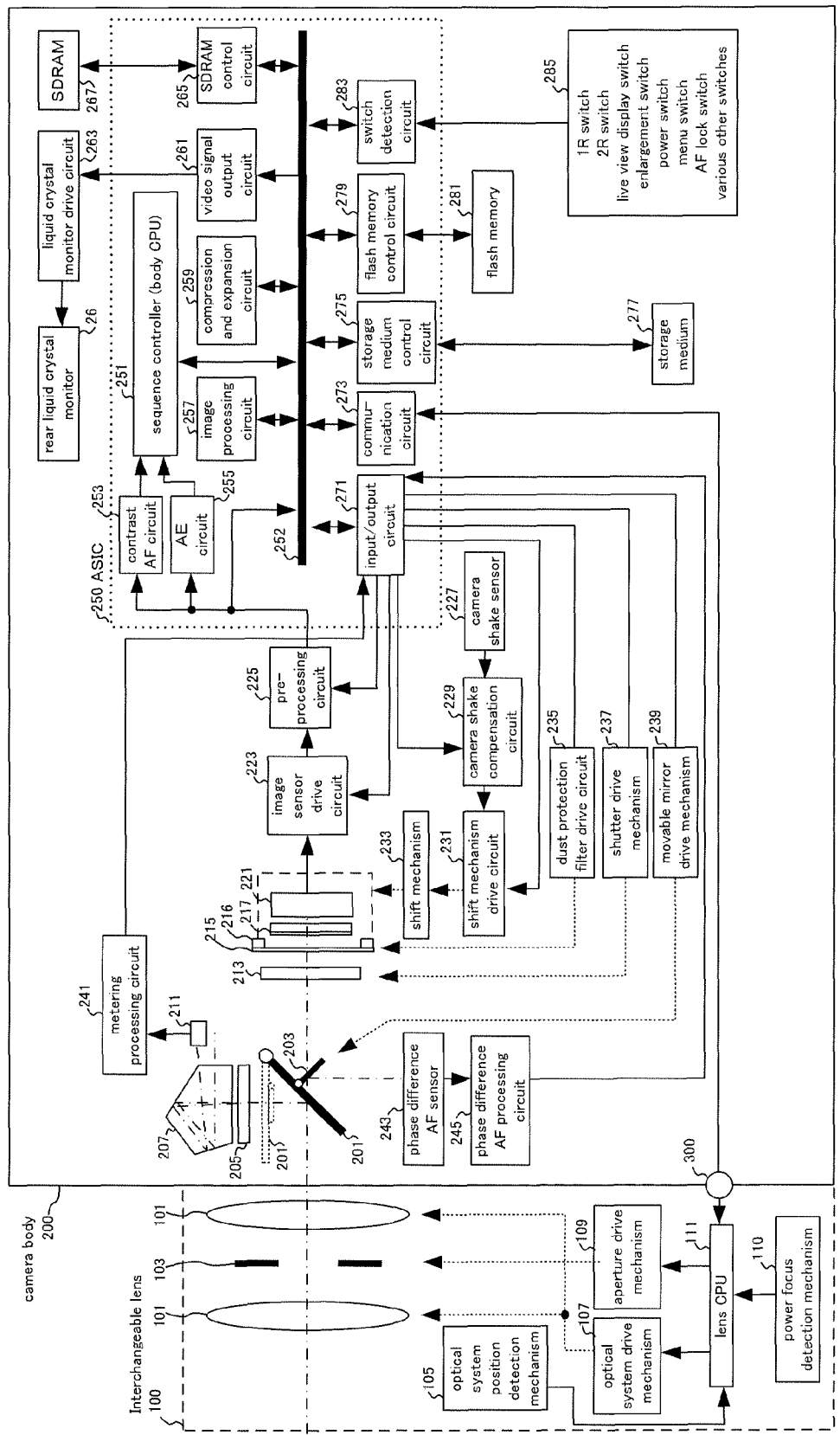
FIG. 2 is a block diagram showing the overall structure of a digital single lens reflex camera of a first embodiment adopting the present invention.

Next, the overall structure principally involved in the electrical systems of the digital single lens reflex camera will be described using FIG. 2. The digital single lens reflex camera relating to this embodiment comprises an interchangeable lens 100 and a camera body 200. With this embodiment, the interchangeable lens 100 and the camera body 200 are constructed as separate bodies, electrically connected by means of a communication contact 300, but it is also possible to integrally construct the interchangeable lens 100 and the camera body 200. A circuit block for the built-in strobe 50 is omitted from FIG. 2.

A photographing optical system 101 for focusing and focal length adjustment, and an aperture 103 for adjusting aperture value, are arranged inside the interchangeable lens 100. The photographing optical system 101 is driven by an optical system drive mechanism 107, while the aperture 103 is driven by the aperture drive mechanism 109. Focal length and focus position of the photographing optical system that has been driven by the optical system drive mechanism 107 are detected by an optical system position detection mechanism 105.

The lens drive mechanism 107, the aperture drive mechanism 109 and the optical system position detection mechanism 105 are respectively connected to a lens CPU 111, and this lens CPU 111 is connected to the camera body 200 by means of the communication contact 300. The lens CPU 111 performs control inside of the interchangeable lens 100, controls the optical system drive mechanism 107 to perform focusing and zoom operations, and controls an aperture value by controlling the aperture drive mechanism 109. Also, the lens CPU 111 transmits the focal length and focus position information detected by the optical system position detection mechanism 105 to the camera body 200.

Inside the camera body 200, a rotatable moving mirror 201 is provided moving between a position inclined by 45 degrees with respect to the lens optical axis for reflecting a subject image to a viewfinder optical system (lowered position, subject image viewing position), and a raised up position for guiding the subject image to the image sensor 221 (raised position, retracted position).

A focusing screen 205 for image forming the subject image is arranged above the movable mirror, and a pentaprism 207 for lateral inversion of the subject image is arranged above this focusing screen 205.

An ocular lens (not shown) for viewing the subject image is arranged at an outgoing side of this pentaprism 207 (the right side in FIG. 2), and a photosensor 211 is arranged next to the ocular lens at a position that does not obstruct viewing of the subject image. This photosensor 211 is connected to a metering processing circuit 241, and output of the photosensor 211 is subjected to processing such as amplification processing and analog-digital conversion by this metering processing circuit 241.

A half mirror is constructed close to the middle of the movable mirror 201, and a sub-mirror 203 for reflecting the subject image that has passed through the half mirror to a lower section of the camera body 200 is provided on a rear surface of the movable mirror 201. This sub mirror 203 is capable of rotation with respect to the moving mirror 201, and when the moving mirror 201 is raised up (position shown by dotted lines in FIG. 2) the sub mirror 203 rotates to a position covering the half mirror part, while when the moving mirror 201 is in a subject image viewing position (lowered position) the sub-mirror 203 is at a position opened with respect to the moving mirror 201, as shown in the drawing.

This movable mirror 201 is driven by a movable mirror drive mechanism 239. Also, a phase difference AF sensor 243 is arranged below the sub-mirror 203, and output of this phase difference AF sensor 243 is connected to a phase difference AF processing circuit 245. The phase difference AF sensor 243 measure defocus amount for a subject image formed using the photographing optical system 101, and is constructed of a well-known phase difference AF optical system for separating peripheral light of the photographing optical system 101 into two luminous fluxes, and a pair of sensors. Also, the phase difference AF sensor 243 is capable of detecting respective focus points for a plurality of points within an exposure screen.

A focal plane type shutter 213 for exposure time control is arranged behind the movable mirror 201, and drive control for this shutter 213 is performed by a shutter drive mechanism 237. An image sensor 221 is arranged behind the shutter 213, and a subject image formed by the photographing optical system 101 is photoelectrically converted into electrical signals. It goes without saying that it is possible to use CCD (Charge Coupled Devices), or a two-dimensional imaging element such as CMOS (Complementary Metal Oxide Semiconductor) as the image sensor 211.

The image sensor 221 is connected to an image sensor drive circuit 223, and readout of image signals from the image sensor 221 etc. is performed by this image sensor drive circuit 223. The image sensor drive circuit 223 is connected to a pre-processing circuit 225, and the pre-processing circuit 225 performs pixel thinning processing for live view display, and pre-processing for image processing such as cropping processing for enlarged display.

A dust protection filter 215, piezoelectric element 216, and infrared cut filter/low pass filter 217 are arranged between the shutter 213 and the image sensor 221. The piezoelectric element 216 is provided around the edge of the dust protection filter, and this piezoelectric element 216 is vibrated with ultrasonic waves by a dust protection filter drive circuit 235. Dust that has become adhered to the dust protection filter 225 is removed by the vibration waves generated in the piezoelectric element 216.

The infrared cut/low pass filter 217 is an optical filter for removing an infrared component and a high frequency component from subject light flux. The dust protection filter 215, piezoelectric element 216, infrared cut/low pass filter 217 and image sensor 221 are formed integrated in an airtight manner so that dust does not infiltrate. The integrated image sensor 221 etc. can be respectively driven in the X-axis direction and Y-axis direction of the image plane of the image sensor 221 by a shift mechanism 233.

A hand-shake sensor 227 is a sensor for detecting vibration caused by hand vibration applied to the camera body 200 etc., and output of this sensor is connected to an image stabilization circuit 229. The image stabilization circuit 229 generates image stabilization signals for removing vibrations such as hand-shake, and output of the image stabilization circuit 229 is connected to a shift mechanism drive circuit 231. The shift mechanism drive circuit 231 receives input of an image stabilization signal, and drives the shift mechanism 233 based on this signal. Using the shift mechanism 233 the image sensor 221 etc. are driven so as to negate vibrations such as hand-shake that are applied to the camera body 200, to perform vibration prevention.

The pre-processing circuit 225 is connected to data bus 252 inside an ASIC (Application Specific Integrated Circuit) 250. A sequence controller (hereafter referred to as a body CPU) 251, image processing circuit 257, compression and expansion circuit 2259, video signal output circuit 261, SDRAM control circuit 265, input/output circuit 271, communication circuit 273, storage medium control circuit 275, flash memory control circuit 279 and switch sensing circuit 283 are connected to this data bus 252.

The body CPU 251 that is connected to the data bus 252 controls operation of this digital single lens reflex camera. A contrast AF circuit 253 and an AE circuit 255 are connected in parallel between the pre-processing circuit 225 and the body CPU 251. The contrast AF circuit 253 extracts a high frequency component based on an image signal output from the pre-processing circuit 225, and outputs contrast information to the body CPU 251 based on this high frequency information. The AE circuit 255 outputs metering information according to subject brightness to the body CPU 251 based on the image signal output from the pre-processing circuit 225.

The image processing circuit 257 is connected to the data bus 252 and carries out various image processing such as digital amplification of digital image data (digital gain adjustment processing), color correction, gamma (γ) correction, and image generation for live view display etc. Also, the compression and expansion circuit 259 is a circuit for compressing image data stored in the SDRAM 267 using a compression system such as JPEG, TIFF etc. The image compression is not limited to JPEG and TIFF, and it is also possible to apply other compression systems.

The video signal output circuit 261 is connected to a liquid crystal monitor 26 via a liquid crystal monitor drive circuit 263. The video signal output section 261 converts image data stored in the SDRAM 267 or the storage medium 277 into video signals for display on the liquid crystal monitor 26. The liquid crystal monitor 26 is arranged on the rear surface of the camera body 200 as shown in FIG. 1, but as long as it is in a position that can be seen by the photographer it is not limited to the rear surface, and also is not limited to a liquid crystal display and can be another display device.

The SDRAM 267 is connected via the SDRAM control circuit 265 to the data bus 261, and this SDRAM 267 acts as a buffer memory for temporarily storing image data that has been subjected to image processing by the image processing circuit 257 or image data that has been compressed by the compression and expansion circuit 259.

The input/output circuit 271 connected to the above described image sensor drive circuit 223, pre-processing circuit 225, image stabilization circuit 229, shift mechanism drive circuit 231, dust protection filter drive circuit 235, shutter drive mechanism 237, movable mirror drive mechanism 239, metering processing circuit 241, and phase difference AF processing circuit 245 controls input and output of data to various circuits, such as the body CPU 251 via the data bus 252.

The communication circuit 273 that is connected to the lens CPU 111 via the communication contact 300 is also connected to the data bus 252, and carries out data exchange with the body CPU 251 etc. and communication for control commands. The storage medium control circuit 275 connected to the data bus 252 is connected to the storage medium 277, and performs control of storing image data etc. to this storage medium 277 and reading of image data etc.

The storage medium 277 is constructed so that any rewritable storage medium, such as xD picture card (registered trademark), Compact Flash (registered trademark), SD memory card (registered trademark) or memory stick (registered trademark) can be fitted, and is removably inserted into the camera body 200. Besides, it is also possible to have a configuration where it is possible to connect to a hard disc via a communication connection point.

The flash memory control circuit 279 is connected to a flash memory 281, and this flash memory 281 stores programs for controlling operation of the digital single lens reflex camera, and the body CPU 251 performs control of the digital single lens reflex camera in accordance with the programs stored in the flash memory 281. Incidentally, the flash memory 281 is an electrically rewritable non-volatile memory.

Various switches 285, including a 1R switch for detecting a first stroke (half pressing) of the shutter release button 21, a 2R switch for detecting a second stroke (full pressing), and a live view display switch that is turned on by operation of the live view display button 33, are connected to the data bus 252 via a switch detection circuit 283.

As the various switches 285 there are also an enlargement switch linking to an enlargement button 34, a power switch, a menu switch linking to a menu button 37, an AF lock switch linking to an AF lock button 28, a continuous shooting/single shot switch linking to a continuous shooting/single shot button 27, and various other switches linking to other operation members.

Figure 3:
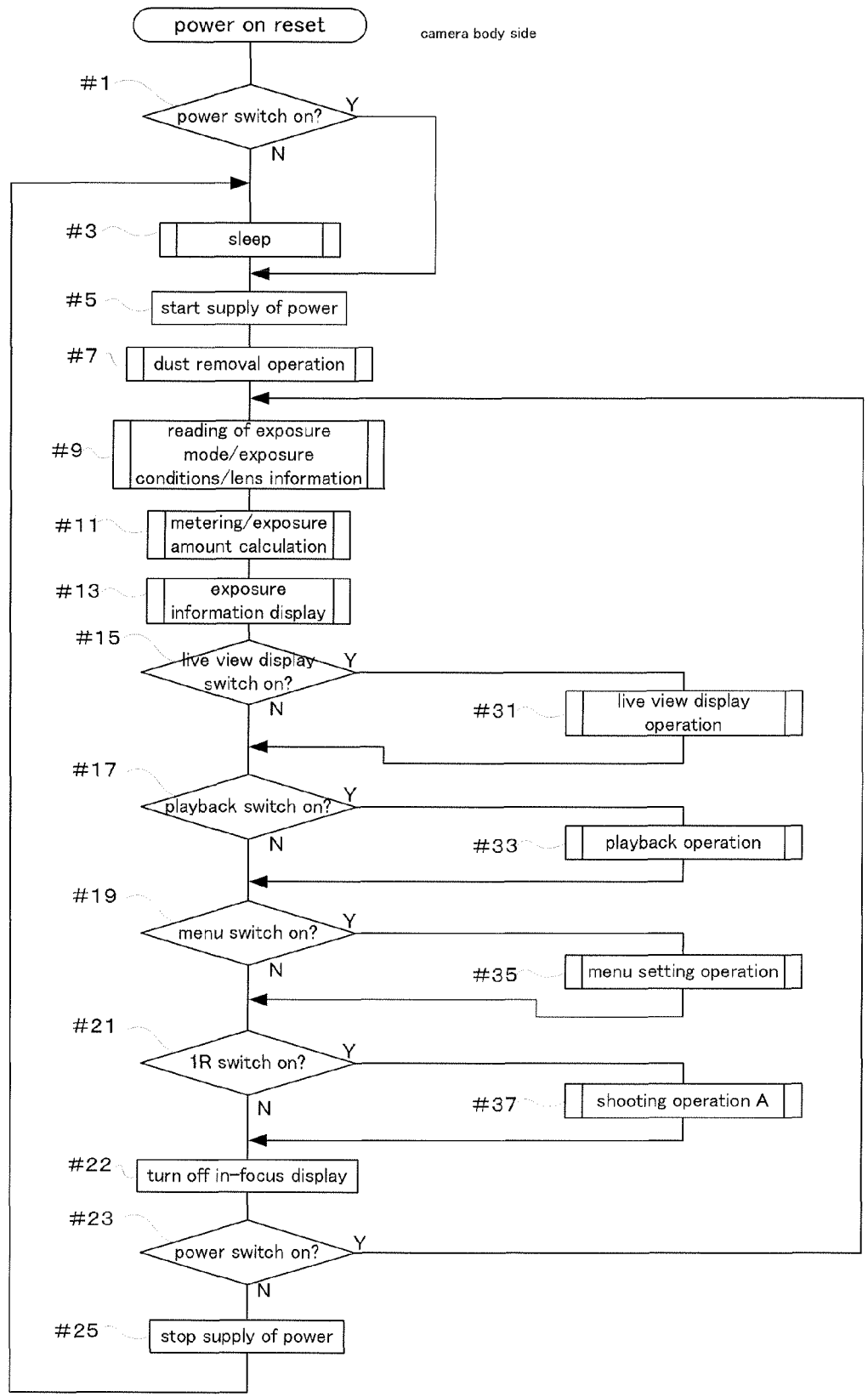
FIG. 3 is a flowchart showing a power-on reset operation, in the camera body, of the first embodiment of the present invention.

Next, operation of the digital camera of a first embodiment of the present invention will be described using the flowcharts shown in FIG. 3 to FIG. 11. FIG. 3 shows a power on reset operation performed by the body CPU 251 at the camera body 200 side. If a battery is fitted into the camera body 200, this flow of operations starts, and the first thing that happens is that it is determined whether the power switch of the camera body 200 is on (#1).

When the result of determination in step #1 is that the power switch is off, a sleep state, which is a low power consumption state, is entered (#3). In this sleep state, interrupt processing is carried out only when the power switch is turned on, and processing for power switch on is carried out in steps #5 and after. Until the power switch is turned on, operations other than power switch interrupt processing are suspended, and consumption of the power supply battery is prevented.

In the event that the power switch was on in step #1, or the sleep state of step #3 is left, supply of power commences (#5). Next, the dust removal operation for the dust protection filter is carried out (#7). This is an operation to apply drive voltage to the piezoelectric element 216 attached to the dust protection filter 215 from the dust protection filter drive circuit 235, and remove dust using ultrasonic vibration waves.

Next, if there is information such as program exposure mode set by the exposure mode dial 22 etc, ISO speed, shutter speed set manually, or aperture value, reading in of these exposure conditions and lens information is carried out (#9). Reading of lens information is the reading of lens characteristic information, such as maximum aperture of the interchangeable lens 100, focal length information, and a lens identification signal, from the lens CPU 111 by means of the communication circuit 273.

Next, metering and exposure value calculation are carried out (#11). In this step, subject brightness is then measured by the photosensor 211, exposure amount is calculated, and exposure control values such as shutter speed and aperture value are calculated in accordance with exposure mode and exposure conditions, using this exposure value. After that, the exposure information is displayed on the liquid crystal monitor 26 (#13). As exposure information, there are exposure mode and exposure conditions read in step #9 and exposure control values for shutter speed and aperture value calculated in #11.

Next, it is determined whether or not the live view display switch is on (#15). As described previously, if the photographer is observing a subject image in live view display, the live view display button 33 is operated. If the result of determination is that the live view display switch is on, a subroutine for live view display operation is executed (#31). This live view display operation will be described later using FIG. 4 to FIG. 6.

If the result of determination in #15 is that the live view display switch is not on, it is determined whether or not the playback switch is on (#17). Playback mode is a mode for reading out still images stored in the storage medium 277 and displaying them on the liquid crystal monitor 26, when the playback button 38 has been operated. If the result of determination is that the playback switch is on, a playback operation is executed (#33).

If the result of determination in #17 is that the playback switch is not on, it is determined whether or not the menu switch is on (#19). In this step, it is determined whether or not the menu button 37 has been operated and the menu mode has been set. If the result of determination is that the menu switch is on, menus display is performed on the liquid crystal monitor 26, and a menu setting operation is carried out (#35). Various setting operations such as AF mode, white balance, ISO speed setting, drive mode setting etc. can be carried out by the menu setting operation.

Figure 12:
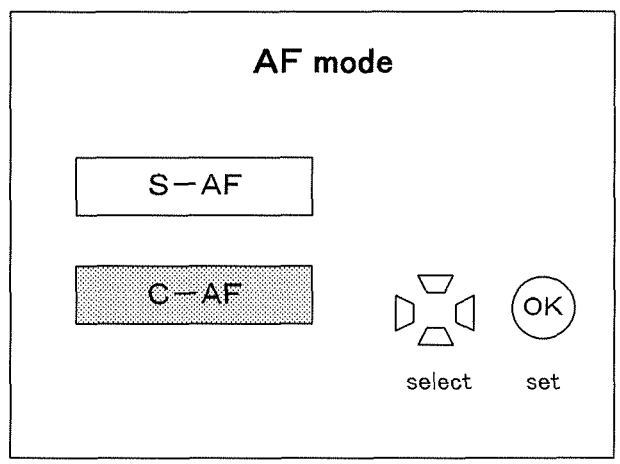
FIG. 12 is a drawing showing an AF mode setting menu display screen of a first embodiment of the present invention.

Single AF (S-AF) mode and continuous AF (C-AF) are provided as AF modes. As shown in FIG. 12, AF mode setting involves selection of an AF mode setting display screen from the menu screen, and on this screen selecting one of the AF modes by operating the cross-shaped button 30, and setting by operating the OK button 31. As the AF mode single AF mode is set as the default value.

If the determination result in step #19 is that menu switch is not on, it is next determined whether or not the release button 21 has been pressed down halfway (exposure preparation operation), that is, whether or not the 1R switch is on (#21). If the result of determination is that the 1R switch is on, a shooting operation A sub routine is executed to carry out exposure preparation and exposure for a still image. This sub-routine will be described in detail later using FIG. 7.

Figure 13:
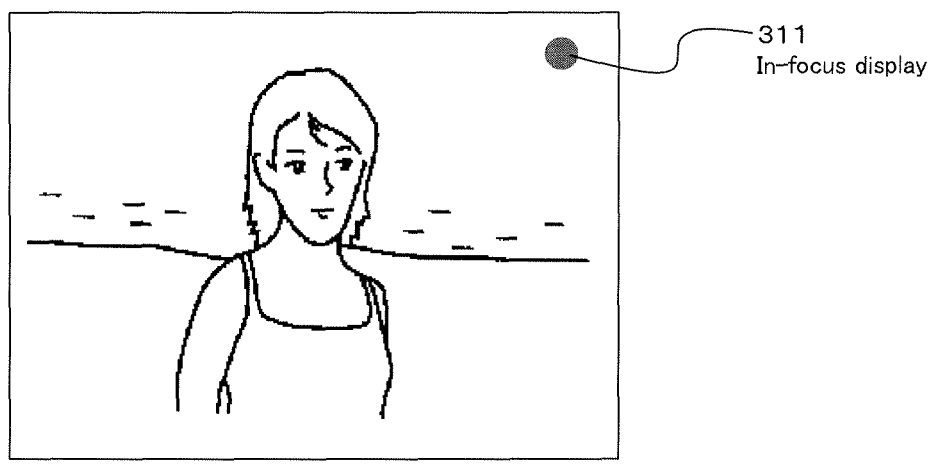
FIG. 13 is a diagram showing focus completion display for a first embodiment of the present invention.

However, if the result of determination in step #21 is that the 1R switch is not on, focus display is turned off (#22). As will be described later, if a focused state is reached using contrast AF and a subject is focused on, an in-focus display 311 as shown in FIG. 13 is displayed (#235 in FIG. 10). If this in-focus display is in effect, it is turned off. Then, as in step #1, it is determined whether or not the power switch is on (#23). If the result of determination is that the power switch is on, processing returns to step #9 and the operations described above are executed. On the other hand, if the power switch is not on, supply of power is stopped (#25), and processing returns to step #3 where the previously described sleep state is entered.

Next, the live view display operation of step #31 will be described using FIG. 4 to FIG. 6. If this subroutine is entered, first of all exposure information display is turned off (#41). In step #13, exposure information is displayed on the liquid crystal monitor 26, but in this step display of this exposure information is stopped in order to display live view on the liquid crystal monitor 26. Then, similarly to step #11, metering and exposure amount calculation are performed (#43).

Next, the movable mirror 201 is retracted from the optical axis of the photographing optical system (#45), and the shutter 213 is opened (#45). As a result of these operations, a subject image is formed on the image sensor 221 by the photographing optical system. Next, live view condition initial setting is carried out (#49). In this step, in order to carry out condition setting for electronic shutter speed and sensitivity when driving the image sensor 221, calculation and setting is carried out in order to display an image having an appropriate brightness on the liquid crystal monitor 26 using results of calculation for light measurement and exposure amount obtained in step #43.

Next, start of live view display is instructed (#51). Specifically, the live view display is instructed to the image sensor 221 and the image processing circuit 257, and image data acquired by the image sensor 221 is displayed as a moving image on the liquid crystal monitor 26. The photographer can then decide on photo composition based on this live view display. The electronic shutter speed and ISO sensitivity etc. are controlled so that screen brightness of the liquid crystal monitor 26 stays constant during live view display.

If live view display is started, it is next determined whether or not the release button 21 has been pressed down halfway, that is, whether or not the 1R switch is on (#53). If the result of determination is that the 1R switch is not on, then similarly to step #22, if the focus display is active the in-focus display is turned off (#54).

Next, it is determined whether or not continuous AF mode has been set as the AF Mode (#55). If the result of determination is that it is not continuous AF mode, that is, in the case where single AF mode has been set, processing jumps to step #77. On the other hand, if continuous AF mode has been set, contrast AF control is carried out (#61).

In this contrast AF control, control is performed so that the photographing optical system 101 reaches an in focus state based on contrast information from the contrast AF circuit 253. This contrast AF control will be described in detail later using FIG. 10. In the event that continuous AF mode has been set, if live view display mode is entered, then in a state where the release button 21 is pressed down halfway, AF control is continuously executed by repeating of step #61.

It is next determined whether or not the live view display switch that links to the live view display button 33 is on (#77). If the live view display button 33 is pressed once, the live view display mode is entered, and if it is pressed again the live view display mode is released. If the result of determination is step #77 is that the live view display switch is on, then the live view display mode is terminated in step #85 and after.

If the result of determination in step #77 is that the live view display switch is not on, it is determined whether or not the playback switch that links to the playback button 38 is on (#79). In order to carry out playback display of image data that is stored in the storage medium 277 on the liquid crystal monitor 26, it is necessary to terminate the live view display. If the result of determination is step #79 is that the live view display switch is on, then the live view display mode is terminated in step #85 and after.

If the result of determination in step #79 is that the playback switch is not on, it is determined whether or not the menu switch that links to the menu button 37 is on (#81). In order to carry out menu display on the liquid crystal monitor 26, it is necessary to terminate the live view display. If the result of determination is step #81 is that the live view display switch is on, then the live view display mode is terminated in step #85 and after.

If the result of determination in #81 is that the menu switch is not on, it is determined whether or not the power switch is on (#83). If the result of determination is that the power switch is off, then in order to carry out power off processing live view display is first terminated in step #85 and after. If the result of determination in step #83 is that the power switch is on, processing returns to step #53 and the operations described above are executed.

If a transition is made to step #85 in order to terminate live view display, first, of all focus display is turned off (#85). As described previously, if a subject is focused on, a first focus display 311 as shown in FIG. 13 is displayed, and so if this focus displays is active it is turned off. Next, an instruction to stop live view display is issued to the pre-processing circuit

225 and the image processing circuit 257 etc. (#87). After that, instruction of a shutter close operation is issued to the shutter 213 (#89), the movable mirror 201 is subjected to a return operation (moved to the lowered position) (#91), and the original routine is returned to.

If the result of determination in step #53 (FIG. 4) is that the 1R switch is on, it is determined whether or not the in-focus display is in progress (#102). If a focused state is reached using contrast AF and a subject is focused on, an in-focus display 311 is carried out (#235 in FIG. 10), and so it is determined whether or not this display is active. If the result of determination is that the in-focus display is in progress, processing jumps to step #107.

On the other hand, if the result of determination in step #102 is that the in-focus display is not in progress, contrast AF control is carried out (#105). Here, similarly to step #61, control is performed so that the photographing optical system 101 reaches an in focus state based on contrast information from the contrast AF circuit 253. If the in-focus display is in progress, the reason the contrast. AF control of step #105 is not executed is that if the photographing optical system 101 is again driven using contrast AF after reaching the in-focus state, operating feeling is not good.

If contrast AF control is completed, then continuing on AE information is read in (#106). Metering in step #43 is with the movable mirror 201 in the lowered position, which means that it is possible to perform metering using the photosensor 211, but in this step the movable mirror 201 is retracted (in the raised up position) and it is not possible to perform metering using the photosensor 211. AE information is therefore obtained based on output of the AE circuit 255.

In the case where continuous AF mode or single AF mode have been set, if the release button 21 has been pressed down halfway, then since before that the in-focus display was not activated (in the case of continuous AF, refer to steps #234, 235 that will be described later), contrast AF control of step #105 is executed once only. If an in focus state is reached with this subroutine and the in-focus display is carried out, the routine of FIG. 6 is returned to, and as a result of determination in step #102 the contrast AF control of step #105 is not executed. Therefore, if an operation to press the release button halfway is carried out focus lock (AF) is carried out regardless of whether continuous AF mode or single AF mode has been set.

Similarly, in the event that continuous AF mode or single AF mode has been set, if the release button 21 is pressed down halfway, reading in of AE information from the AE circuit 255 based on image data, and the metering and exposure amount calculation, in step #106 is carried out once only. If an in focus state is reached with this subroutine and the in-focus display is carried out, the routine of FIG. 6 is returned to, and after that, as a result of determination in step #102 the reading of AE information in step #106 is not executed. Therefore, if an operation to press the release button 21 halfway is carried out AE lock is carried out regardless of whether continuous AF mode or single AF mode has been set. Evaluative metering takes place based on AE information read at the time of this AE lock.

Next it is determined if the release button 21 has been pressed down fully (exposure operation), that is, if the 2R switch is on (#107). If the result of determination is that the 2R switch is not on (that is, it is off), processing returns to step #53 and the operations described above are executed. On the other hand, if the 2R switch is on, a shooting operation is executed in steps #109 and after.

If the exposure operation is entered, first live view display is stopped (#109). Next, the shutter 213 is closed (#111). During live view display, the shutter 213 is opened, and a subject image is displayed on the liquid crystal monitor 26 based on output of the image sensor 211, but the shutter 213 is temporarily closed in order to enter the exposure operation. After that, similarly to step #22, the in-focus display is turned off (#113).

Next, a shooting operation B is carried out to acquire and store image data for a still image based on the subject image (#125). This exposure operation B will be described later using FIG. 8. If the exposure operation B is completed, processing returns to step #43, live view display is resumed, and the operations described above are executed.

Figure 7:
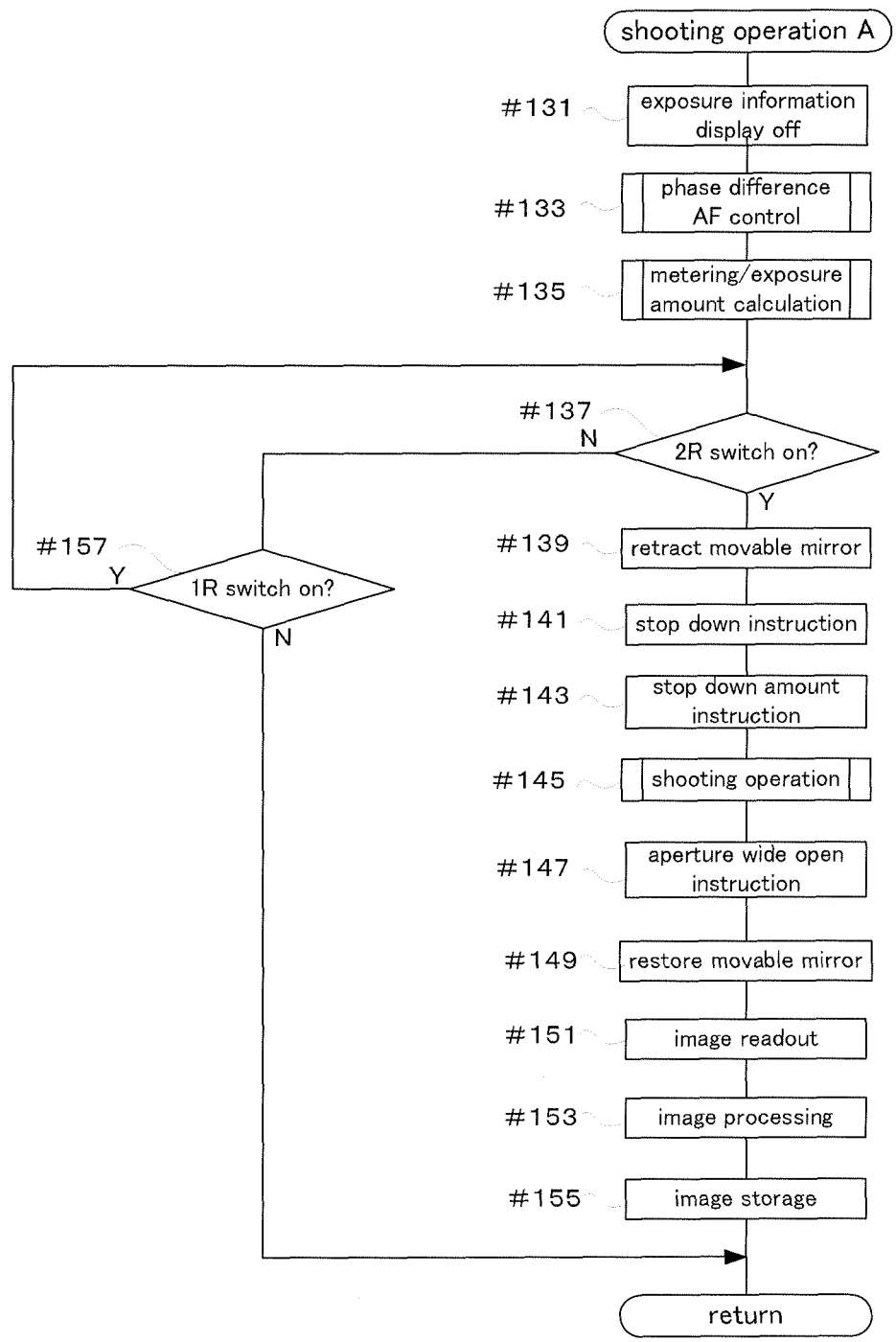
FIG. 7 is a flowchart showing a shooting operation A of the first embodiment of the present invention.

Next, a sub-routine for the exposure operation A of step #37 will be described using FIG. 7. This exposure operation A is a subroutine executed when the release button 21 has been pressed down halfway in the normal optical viewfinder viewing state (that is, non-live view display). If the exposure operation A subroutine is entered, first of all exposure information display is turned off (#131). Next, a phase difference AF subroutine is carried out (#133). Specifically, defocus direction and defocus amount are obtained based on output of the phase difference AF sensor 243, and focusing of the photographing optical system 101 is carried out. This sub-routine will be described in detail later using FIG. 9.

If phase difference AF is completed, then similarly to step #11 metering and exposure value calculation are carried out, and exposure control values such as shutter speed and aperture value are obtained (#135). Next it is determined whether or not the shutter button 21 has been pressed down fully, that is, if the 2R switch is on (#137).

If the result of determination in step #137 is that the 2R switch is not on, it is then determined whether or not the 1R switch is on (#157). If the result of determination is that the 1R switch is not on, the exposure operation A is terminated and the original routine is returned to. On the other hand, if the result of determination is that the 1R switch is on, step #137 is returned to, and a standby state is entered where the states of the 1R switch and the 2R switch are mutually detected.

If the result of determination in step #137 is that the 2R switch is on, processing transfers to a step for performing exposure. First a retraction operation for the movable mirror 201 (moving to the raised position) is carried out (#139). As a result, subject light flux is guided to the image sensor 221 by the photographing optical system 101. Next, a stopping down operation is instructed to the lens CPU 111 (#141) and a stopping down amount is also instructed (#143).

As a result, it is possible to prepare entry to the exposure operation, and so a shooting operation is started (#145). Exposure is the starting of travel of the front curtain of the shutter 213, together with charge accumulation of the image sensor 221. If a time corresponding to the shutter speed acquired in step #135, or a shutter speed that was manually set by the photographer, has elapsed, travel of the rear curtain of the shutter 213 starts, and charge accumulation of the image sensor 221 is terminated.

If the exposure operation is completed, an instruction to fully open the aperture is output to the lens CPU 111. Next, a restore operation of the movable mirror to the lowered position is carried out (#149), and image signals are read out from the image sensor 221 (#151). Image processing of the read out image signals is carried out by the image processing circuit 257 etc. (#153), and the processed image data is stored in the storage medium 277 (#155). Once image storing is finished, the original routine is returned to.

Figure 8:
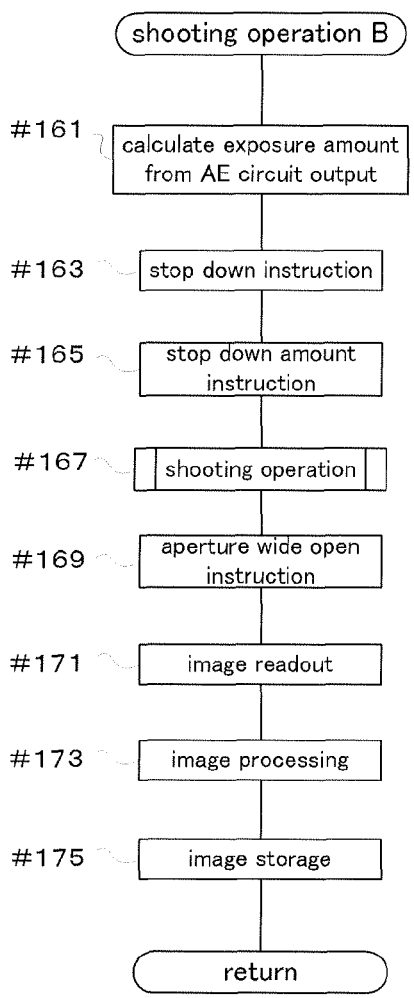
FIG. 8 is a flowchart showing a shooting operation B of the first embodiment of the present invention.

Next, a sub-routine for the exposure operation B of step #125 (FIG. 6) will be described using FIG. 8. This exposure operation B is a subroutine executed in the event that the release button 21 is pressed down fully in the live view display state. If the subroutine for exposure operation B is entered, exposure values are calculated based on output of the AE circuit 255 (#161).

Next, similarly to steps #141 and #143, a stopping down instruction and a stopping down amount instruction are issued (#163 and #165). Then, similarly to step #145, a shooting operation is carried out (#167), and as a result image data of the subject image is acquired based on output of the image sensor 221. After that, similarly to steps #147, #151, #153 and #155, full opening of the aperture is instructed (#169), image signals are read out (#171), and image processing is carried out (#173) and stored in the storage medium 277 (#175). Once image storing is finished, the original routine is returned to.

Figure 9:
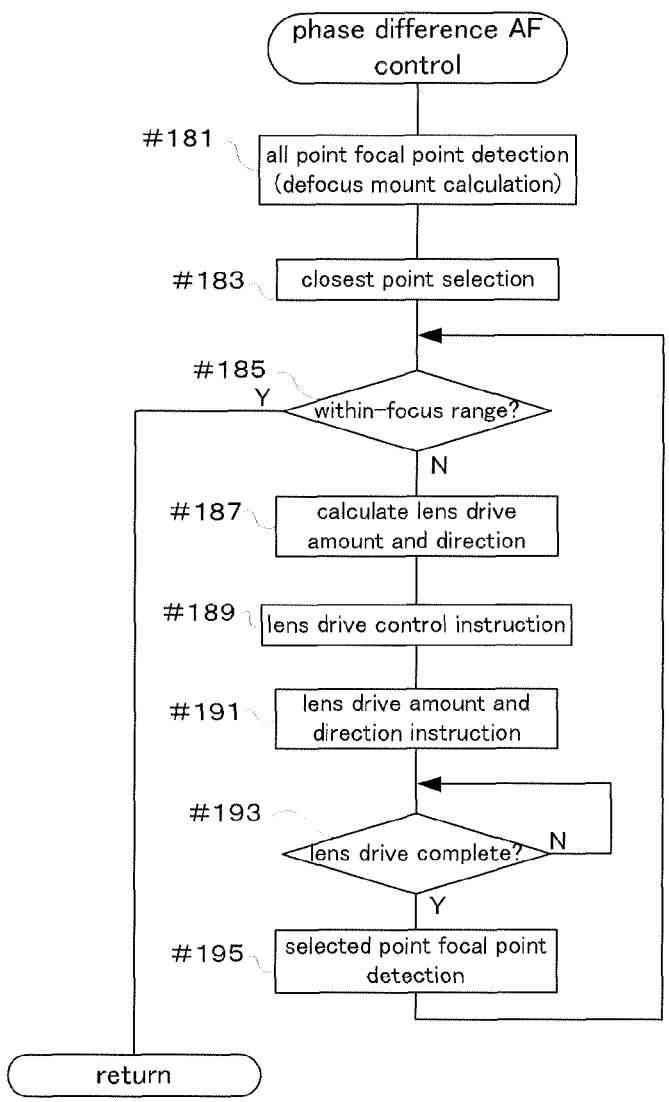
FIG. 9 is a flowchart showing phase difference AF control of the first embodiment of the present invention.

Next, a sub-routine for phase difference AF control of step #133 (FIG. 7) will be described using FIG. 9. This phase difference AF control is for obtaining defocus direction and defocus amount of the photographing optical system 101 with a well known phase difference method, using two peripheral light fluxes of the photographing optical system 101.

If the phase difference AF control subroutine is entered, first all point focus detection is carried out (#181). Specifically, defocus direction and defocus amount are detected for all points where detection is possible using the phase difference AF sensor 243 and the phase difference AF processing circuit 245. Next, a point that is at the closest distance is selected from among all the detected points (#183). Generally, the main subject is most often that which is the closest subject, and selection is carried out to this end.

Next, it is determined whether or not a focus range has been entered into based on defocus amount of the elected closest point. A determination reference for whether or not the focus range is entered is determination as to whether or not the defocus amount has come within a focus tolerance value based on a permissible circle of confusion. If the result of determination is that it is within a focus range, the original routine is returned to. This permissible circle of confusion is set in accordance with the imaging resolution of the image sensor 221, in other words, the sensor size of the image sensor 221.

On the other hand, if the result of determination is that it is not within a focusing range, drive direction and drive amount for driving the photographing optical system 101 using the optical system drive mechanism 107 are calculated based on defocus direction and defocus amount for the selected focus detection point (#187). Lens drive control for the optical system drive mechanism 107 is then instructed to the lens CPU 111 (#189), and the lens drive amount and drive direction at that time are instructed (#191).

If a lens drive control instruction is output to the lens CPU 111, the body CPU 251 awaits input of a signal indicating lens drive completion from the lens CPU 111 (#193). If lens drive is completed, focus detection is carried out for the focus detection point selected in step #183 (#195). If focus detection is completed, processing returns to step #185 and the steps described above are repeated until a focus range is entered.

Next, a sub-routine for contrast AF control of step #61 (FIG. 4) and step #105 (FIG. 6) will be described using FIG. 10. This contrast AF control is performing drive of the photographing optical system 101 so that contrast information of the contrast AF circuit 253 becomes maximum based on output of the image sensor 221. This contrast AF control can be used when the movable mirror 201 is at the retracted position (raised up position) and it is not possible to perform phase difference AF control based on output of the phase difference AF sensor 243.

If the contrast. AF control subroutine is entered, first of all a register DC is set to 1 (#201). This register DC is a register that is used in order to determine drive direction for the lens drive. Next, the lens feed direction is set as the drive direction (#203). A second specified value is then set as a lens drive amount (#204). This first specified value is equivalent to feed amount LD1 of the focus lens inside the photographing optical system 101 in FIG. 14.

Next, contrast information is acquired from the contrast AF circuit 153 (#207). It is then determined whether or not this contrast information is lowered compared to the time before (#208). That is, the acquired contrast information is compared with the previously acquired contrast information. In the case where continuous AF mode is set and step #208 is executed repeatedly, at the time of initially processing this step, there is no contrast information stored for the time before, and so processing essentially advances to step #209 without performing this comparison.

If the result of determination in step #208 is that contrast information has not lowered, the original routine is returned to and focal point adjustment using contrast AF control is not carried out. On the other hand, if contrast information is lowered, processing advances to step #209 and beyond, and drove of the photographing optical system is carried out. In the event that contrast information is not lowered, if contrast AF control is carried out the photographing optical system 101 is driven more than necessary, and the subject image becomes unattractive. Therefore, lens drive is carried out using contrast AF control only in the case where contrast information is lowered. It is preferable to carry out lens drive only in the event that contrast information is lowered a specified amount or more.

If the result of determination in step #208 is that the contrast information has lowered, then together with instructing lens drive control to the lens CPU 111 (#209), lens drive direction that was set in step #203 and drive amount that was set in step #204 are sent (#211). If these signals are transmitted, the lens CPU 111 drives the photographing optical system 101 using the optical system drive mechanism 107. If drive control based on the set drive direction and drive amount is completed, the lens CPU 111 transmits a lens drive completion signal to the body CPU 251.

The body CPU 251 awaits receipt of the lens drive completion signal (#213), and upon receipt acquires newest contrast information from the contrast AF circuit 253 (#215). Next, it is determined whether or not contrast has improved compared to the previous time (#217). If the result of determination is that the contrast this time has improved, 1 is added to the register DC (#219), processing returns to step #209, and the previously described steps are repeated.

If the result of determination in #217 is that the contrast is lower than the time before, it is determined whether or not the value of the register DC is 1 (#221). If the result of determination is that the register. DC is 1, the lens drive direction is reversed from that the time before (#223), processing returns to step #209, and the previously described steps are repeated.

Specifically, at the time of initial lens drive, the direction in which it should be driven is unclear, and the lens is temporarily driven in the feed direction. If the result of driving is that contrast is improved, the drive direction is correct (approaching the focus position) while if contrast is lowered the drive direction is backwards (moving away from the focus position) and so the drive direction is reversed. Accordingly, if the register DC is 1 it is determined to be the initial drive direction and processing advances to step #223 where the drive direction is reversed, while if the register DC is not 1 it is determined that contrast has reached a peak position and processing advances to step #225.

If the result of determination in step #221 is that register DC is not 1, the lens has been driven in a direction that improves contrast, but since it is lowered here it is determined that the peak contrast position has been passed, and the drive direction is made opposite to that the time before (#225). A second specified value is then set as a lens drive amount (#226).

Figure 14:
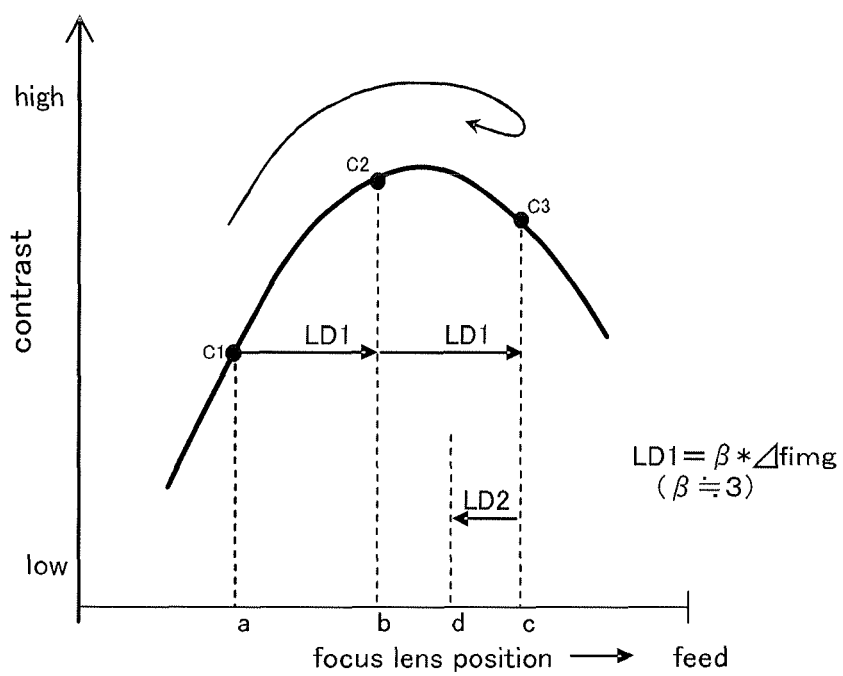
FIG. 14 is a drawing showing a relationship between contrast information and focus lens drive for the first embodiment of the present invention.

The second specified value (corresponding to focus lens feed amount LD2) for the lens drive amount is equivalent to half the feed amount. LD1 of the focus lens, as shown in FIG. 14. Since the peak contrast position has been passed, it is assumed that the peak position is somewhere between this time and the previous time, and the first specified value is halved. Lens drive control is then instructed to the lens CPU 111 (#229), and the lens drive direction and drive amount that were set in steps #225 and #226 are transmitted (#231).

Upon receipt of the lens drive control instruction etc, the lens CPU 111 commences drive control for the optical system drive mechanism 107, and once drive is performed by a drive amount based on the second specified value a lens drive completion signal is transmitted to the body CPU 251. The body CPU 251 awaits receipt of the lens drive completion signal (#233), and once this completion signal is received it is determined whether or not the release button 21 has been pressed down halfway, that is, whether or not the 1R switch is on (#234).

If the result of determination in step #234 is that the 1R switch is not on, processing jumps to step #241, while if the 1R switch is on in-focus display is carried out (#235). This is in-focus display 311 on the display screen of the liquid crystal monitor 26, as shown in FIG. 13. Here, if the release button 21 has not been pressed down halfway, the reason that the in-focus display 311 is not displayed is because at the time when contrast AF mode is set, focus adjustment is carried out continuously, and having the in-focus display flashing according to the in-focus state is visually undesirable.

A lens position information request is then instructed to the lens CPU 111 (#241). The lens CPU 111 acquires lens position information from the optical system position detection mechanism 105, and transmits this information to the body CPU 251. The body CPU 251 acquires the transmitted lens position information (#243). After that, the original routine is returned to.

Within this embodiment, in the event that a peak position of contrast is passed, the drive amount is halved and drive performed in the opposite direction (#225, #226), but this is not limiting and it is also possible, for example, to cause drive to a peak contrast position by interpolation calculation such as three-point interpolation method.

Next, focus precision and focus lens operation amount for contrast AF of this embodiment will be described using FIG. 14. The permissible defocus amount Δ f img for imaging equivalent to the permissible circle of confusion diameter φimg of the image sensor 221 is:

$$\Delta fimg = \phi img/F$$

and here, F is lens aperture value (F number) F=D/f (D is opening diameter, f is focal distance)

Accordingly, focusing precision for the focusing display (#235), has a drive amount set to a first specified value, and if, as shown in FIG. 14, β*Δ f img is adopted as the first specified value, it is possible to obtain a degree of focusing precision about that of the permissible circle of confusion diameter φimg of the image sensor 221. Here, β is an empirical value.

Figure 11:
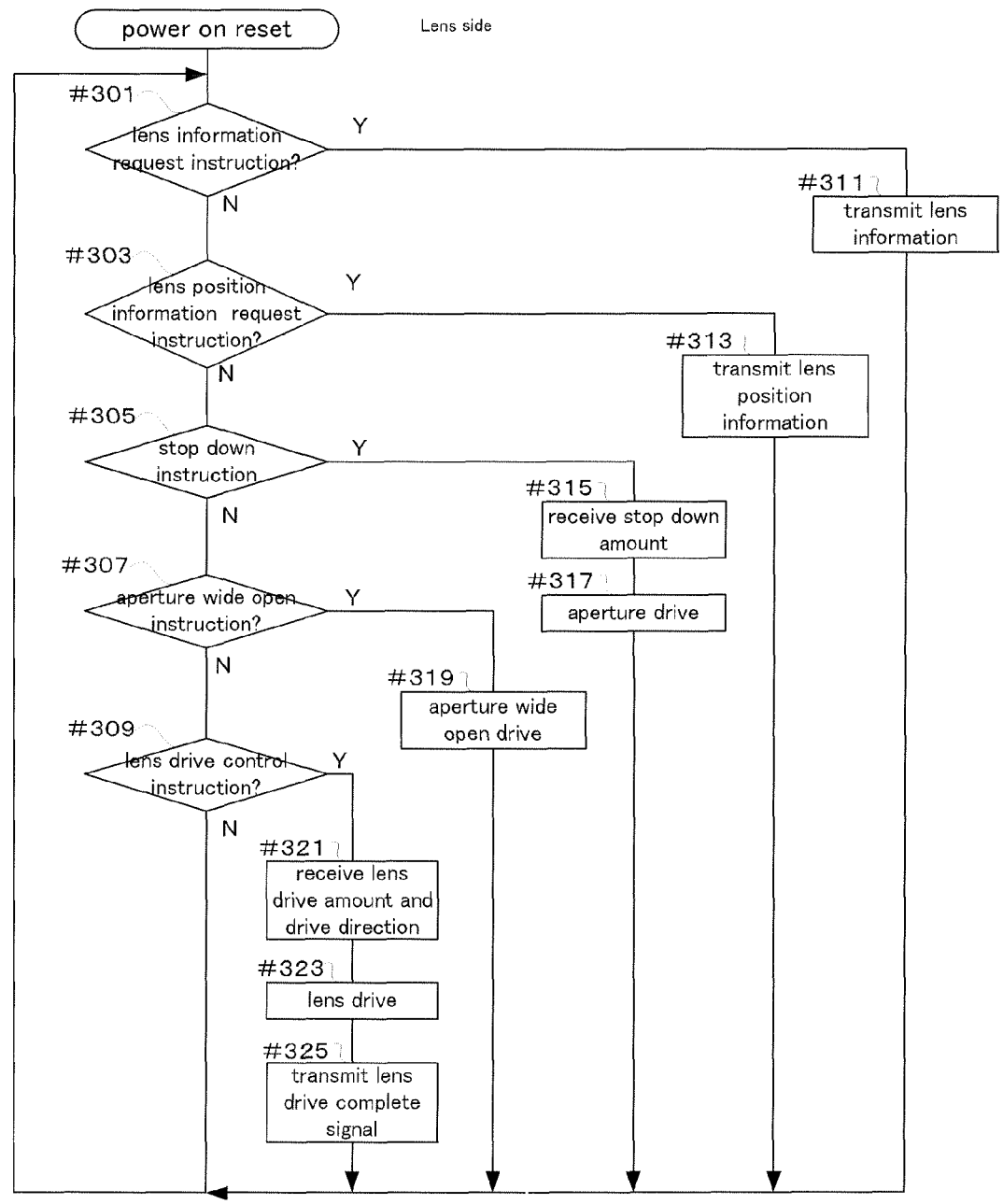
FIG. 11 is a flowchart showing a power-on reset operation, in an interchangeable lens, of the first embodiment of the present invention.

Next, operations by the lens CPU 111 of an interchangeable lens 100 will be described using FIG. 11. First, it is determined whether or not a lens information request instruction has been issued from the body CPU 251 (#301). If the result of determination is that there is a request instruction, the lens information is transmitted (#311). As the lens information here, there is maximum aperture value, lens color balance information, aberration information, information for AF, lens specific information etc., and information stored inside the lens CPU 111 or in a not shown electrically rewritable memory such as EEPROM If the result of determination in #301 is that there is no lens information request instruction, it is determined whether or not there is a lens position information request (#303). If the result of determination is that there is a position information request, the lens position information is transmitted to the body CPU (#313). The lens position information is detected by the optical system position detection mechanism 105, and so this information is transmitted.

If the result of determination in #303 is that there is no position information request instruction, it is determined whether, or not there is a stop down instruction (#305). If the result of determination is that there is a stop down instruction, the aperture value transmitted from the body CPU 251 is received (#315). Once the aperture value is received, control of stop down drive of the aperture 103, carried out by the aperture drive mechanism 109, is carried out (#317).

If the result of determination in #305 is that there is no stop down instruction, it is determined whether or not there is an aperture wide open instruction (#307). If the result of determination is that there is an aperture wide open command, control of wide open drive of the aperture 103, carried out by the aperture drive mechanism 109, is carried out (#319).

If the result of determination in #307 is that there is no wide open instruction, it is determined whether or not there is lens drive control instruction (#309). If the result of determination is that there is a lens drive control instruction, a transmitted lens drive amount and drive direction are received (#321). Once the lens drive amount and drive direction are received, the lens CPU 111 controls the optical system drive mechanism 107 to carry out drive control of the photographing optical system 101 (#323). Then, if a specified drive amount is driven, a lens drive completion signal is transmitted to the body CPU 251 (#325).

As has been described above, with the first embodiment of the present invention, when continuous AF mode has been set, together with commencement of a live view display operation (#51) the focal point adjustment operation using the contrast AF means (#61) is repeatedly executed. Since the automatic focal point adjustment starts before the release button is pressed down halfway, it is possible to achieve high focusing precision, and it is possible to avoid focus becoming soft, or not sharp. It is also possible to shorten the shutter time lag. Further, if live view display is started, automatic foal point adjustment has started, and so it is possible to observe the subject image with the subject in focus.

Also, with the first embodiment of the present invention, focus (AF) lock and AE lock are executed (#105, #106) in response to the release button 21 being pressed down halfway (#53). Therefore, automatic focus adjustment is carried out after the release button 21 has been pressed down halfway, and it is possible to prevent the subject image becoming difficult to make out. Still further, it is possible to shorten time lag because AE lock and AF lock are in effect.

Further, with the first embodiment of the present invention, evaluative metering based on image data acquired at the time of AE lock is executed (#106) in response to the release button 21 being pressed down halfway. As a result, after AE lock has been performed, even if framing is changed the focus at the time of pressing the release button down halfway is maintained, and it is possible to obtain appropriate exposure for the subject image at this time.

Next, a second embodiment of the present invention will be described using FIG. 15 to FIG. 18. With the first embodiment of the present invention, if the live view operation is started (refer to FIG. 4), in the case where continuous AF is selected automatic focus adjustment is carried out using contrast. AF control (refer to step #61), and if the release button 21 is pressed down halfway (refer to step #53) automatic focus adjustment is carried out using contrast AF control (refer to step #102) until an in-focus state is reached. With the second embodiment of the present invention, if the live view operation is started (refer to FIG. 15), in the case where continuous AF is selected automatic focus adjustment is carried out using contrast. AF control (refer to step #61) at a first time interval (step #57), and if the release button 21 is pressed down halfway (refer to step #53) contrast AF control is carried out (refer to steps #101, #105) at a second time interval that is shorter than the first time interval.

Figure 15:
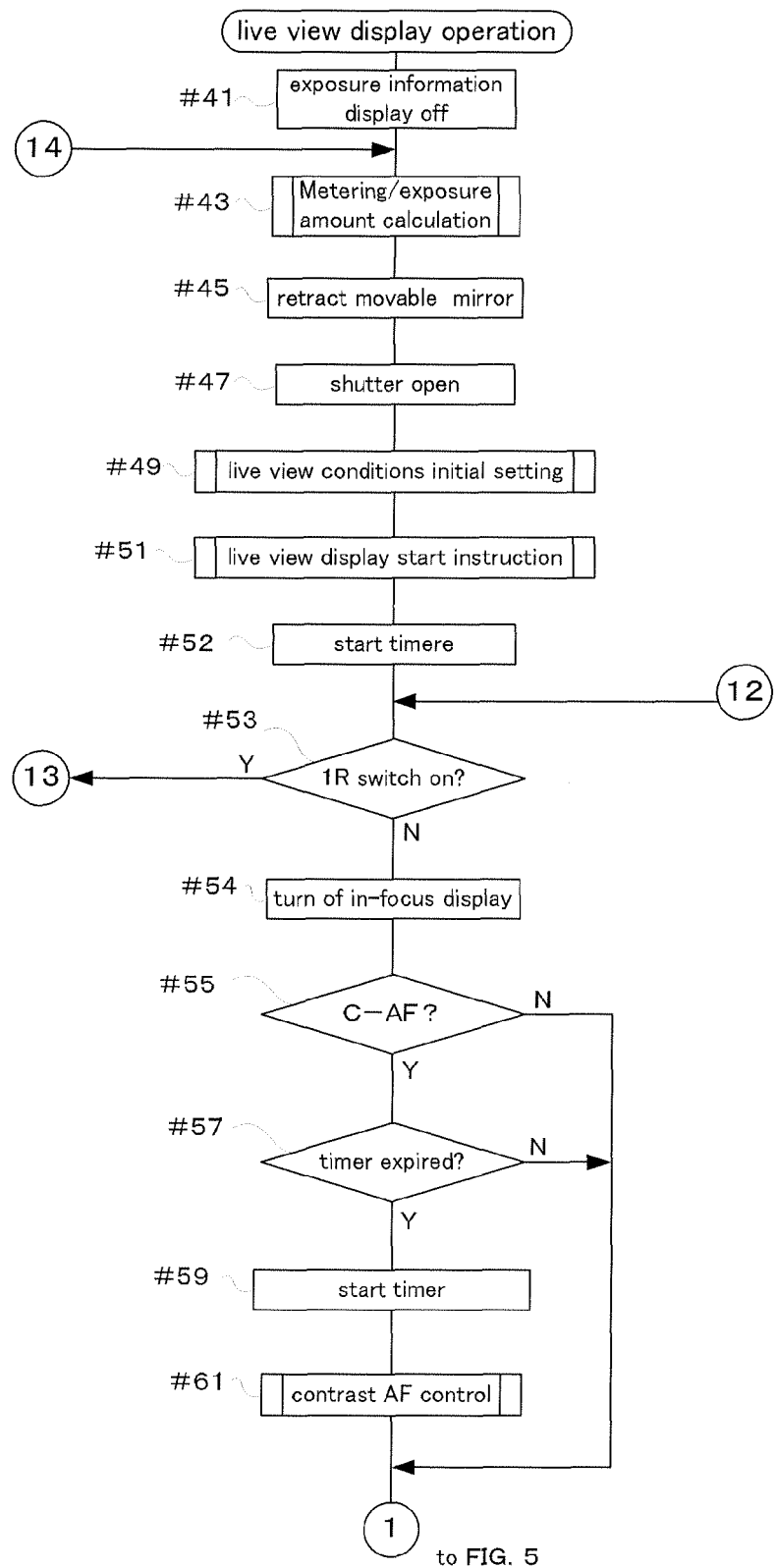
FIG. 15 is a flowchart showing a live view display operation of a second embodiment of the present invention.
Figure 18:
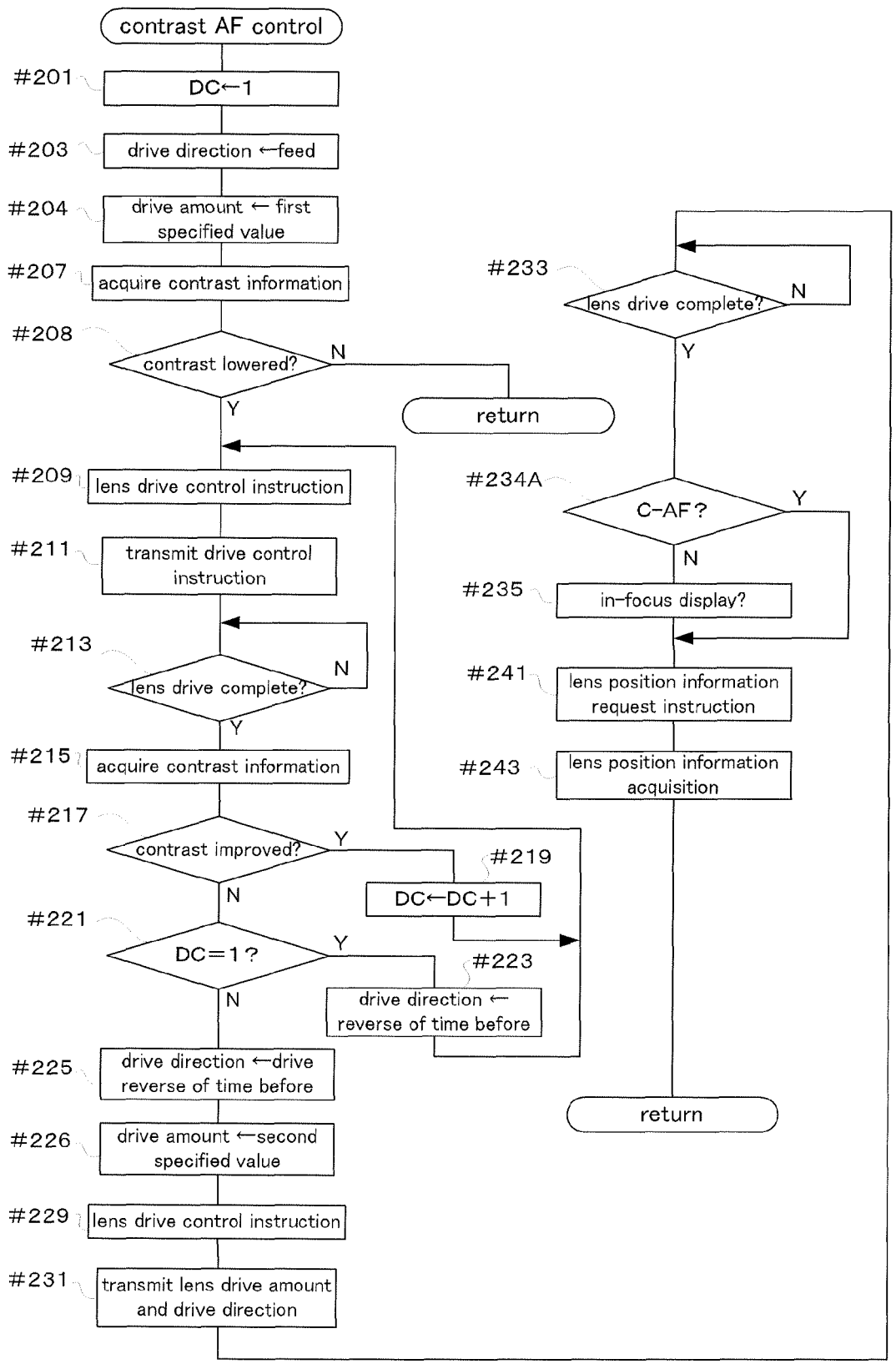
FIG. 18 is a flowchart showing contrast AF control of the second embodiment of the present invention.

The structure of the second embodiment is substantially the same as that of the first embodiment, and the flowcharts shown in FIG. 4 to FIG. 6, and FIG. 10 are replaced with the flowcharts of FIG. 15 and FIG. 18, with description centering on points of difference.

If the flow of the live view display operation shown in FIG. 15 is entered, then similarly to the first embodiment, from the exposure information display of step #41 to the instruction for live view display start of step #51, is carried out. The processing for this sequence of steps is the same as for the first embodiment, and so detailed description will be omitted. If instruction for commencement of live view display is carried out, a timer for controlling the time interval for executing contrast AF control is started (#52).

Next, it is determined whether or not the release button 21 has been pressed down halfway, that is, whether or not the 1R switch is on (#53). If the result of determination is that the 1R switch is not on, then similarly to step #22, if the focus display is active the in-focus display is turned off (#54).

Next, it is determined whether or not continuous AF mode has been set as the AF Mode (#55). If the result of determination is that it is not continuous AF mode, that is, in the case where single AF mode has been set, processing jumps to step #77. On the other hand, if continuous AF mode has been set, it is determined whether or not the timer for controlling the interval for contrast AF control has expired (#57).

This timer is started in step #52 or step #59, and determines a time interval for contrast AF control (the previously described first time interval). If the result of determination is that a specified time has not elapsed, processing jumps to step #77, while if the specified time has elapsed the timer is reset and started again (#59). After that, contrast AF control is carried out (#61).

In this contrast AF control, control is performed so that the photographing optical system 101 reaches an in focus state based on contrast information from the contrast AF circuit 253. This contrast AF control will be described in detail later using FIG. 18. In the event that continuous AF mode has been set, if live view display mode is entered, then in a state where the release button 21 is not pressed down halfway, since step #59 is repeatedly passed through contrast AF control is continuously executed at a specified time interval (first time interval) determined by a timer.

Figure 16:
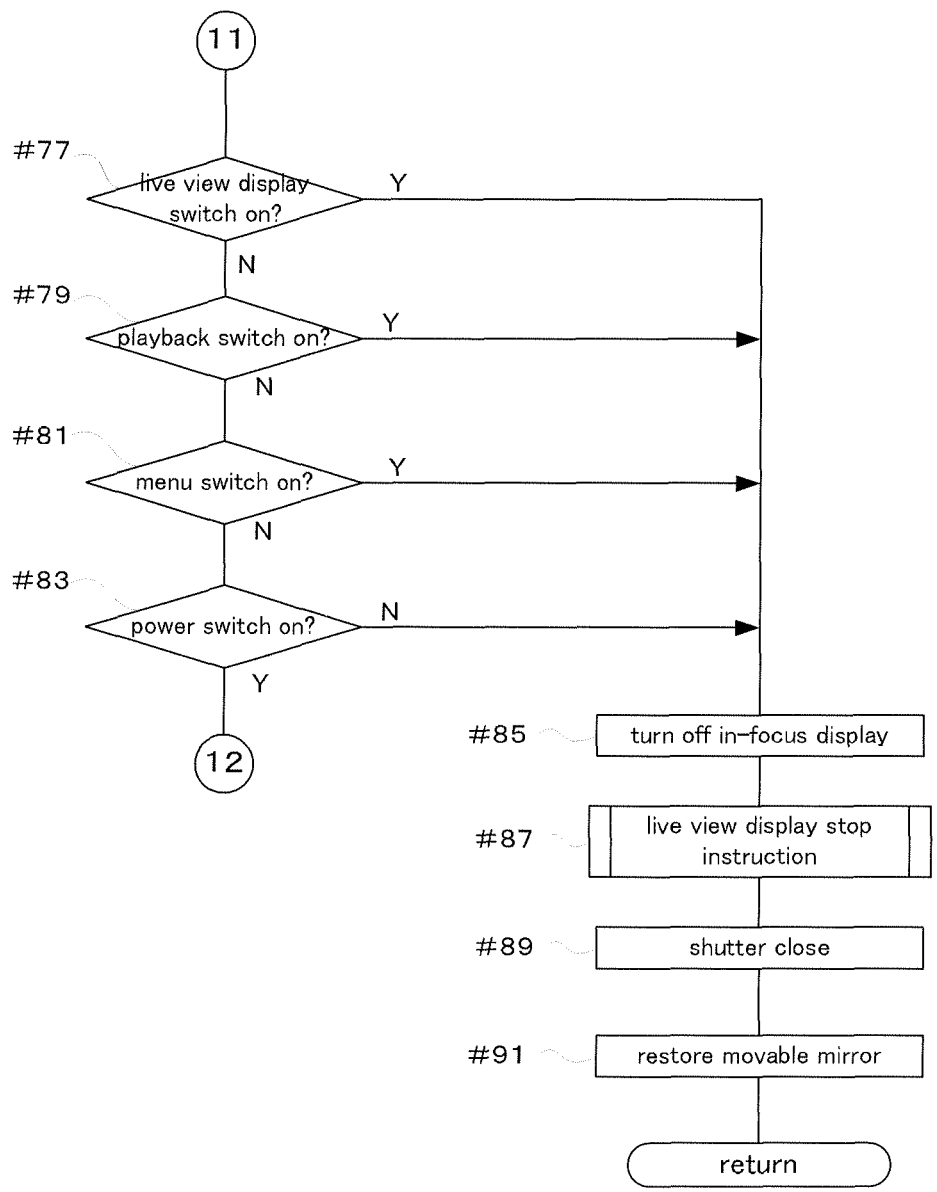
FIG. 16 is a flowchart showing a live view display operation of a second embodiment of the present invention.

If the contrast AF control of step #61 is completed, or if it is determined in step #55 that continuous AF has not been set, or it is determined in that step #57 that the timer has not expired, processing advances to step #77 (FIG. 16). The processing of step #77 and after is the same as the flow described in FIG. 5, and so detailed description will be omitted.

Figure 17:
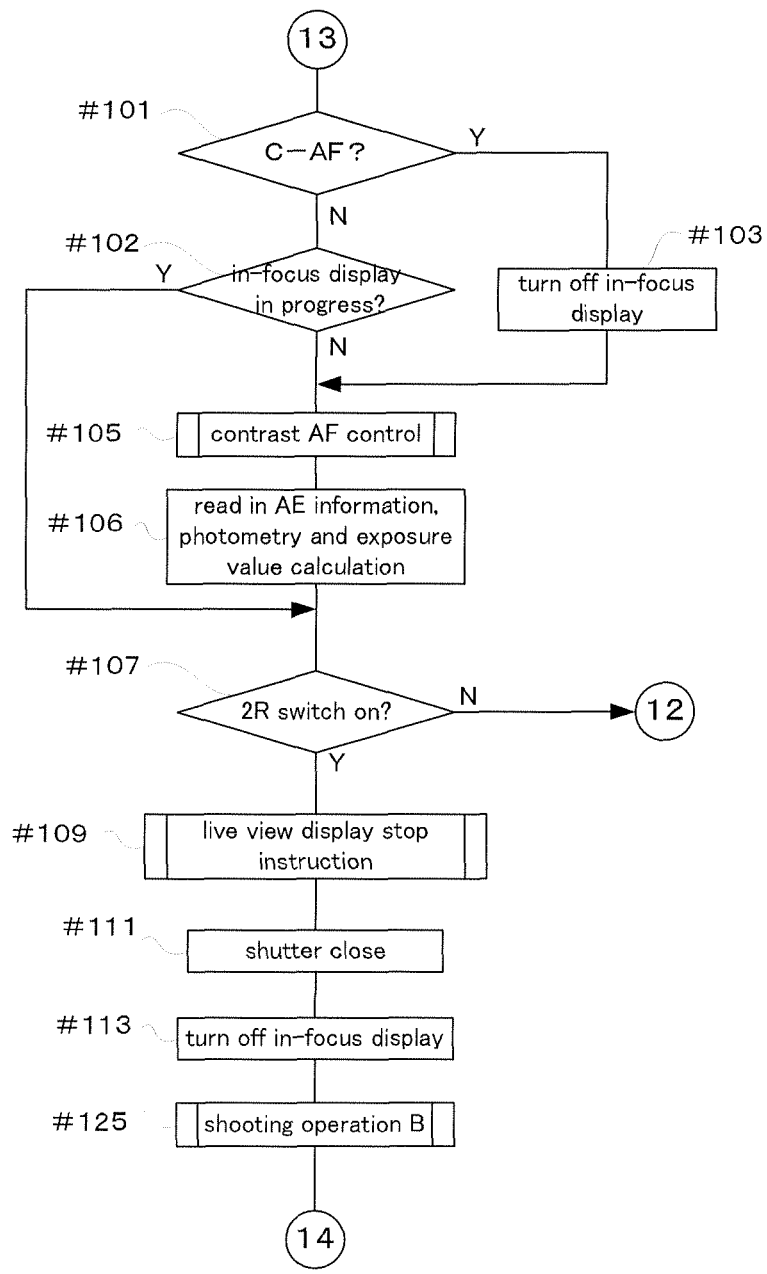
FIG. 17 is a flowchart showing a live view display operation of a second embodiment of the present invention.

If the result of determination in step #53 (FIG. 15) is that the 1R switch is on, then similarly to step #55 it is determined whether or not continuous AF has been set as the AF mode (FIG. 17, #101). If the result of determination is that continuous AF mode has been set, then the in-focus display is turned off, the same as in step #22 (#103).

In this embodiment, if continuous AF mode has been set, the in-focus display 311 (FIG. 13) is not displayed. This is because at the time of continuous AF mode focus adjustment is taking place continuously, and at this time flashing of the in-focus display in response to the in-focus state is visually undesirable.

If the result of determination in step #101 is that continuous AF mode is not in effect, that is, in the case of single AF mode, it is next determined whether or not the in-focus display is in progress (#102). As has been described above, if the photographing optical system 101 is put in a focused state using contrast AF, the in-focus display 311 is brought into effect. After a focused state has been reached with single AF mode, since it is not necessary to carry out contrast AF again in step #105, if the result of determination in step #102 is that the in-focus display is in progress, that is, that an in focus state has been reached, there is a jump to step #107, and steps #105 and #106 are skipped.

If contrast AF control is completed, then continuing on AE information is read in (#106). Metering in step #43 is with the movable mirror 201 in the lowered position, which means that it is possible to perform metering using the photosensor 211, but in this step the movable mirror 201 is retracted (in the raised up position) and it is not possible to perform metering using the photosensor 211. AE information is therefore obtained based on output of the AE circuit 255.

If continuous AF mode is set and live view display is started (#51), unless the release button 21 has been pressed down halfway (#53→No) then it is checked whether a specified time has been reached by the timer (#57) and contrast AF control is performed (#61). However, if the release button 21 has been pressed down halfway (#53→Yes), then a sequence of step #101→#103→#105→#106→#107 No→#53 is carried out. Since at this time the timing operation by the timer is not carried out, then compared to before pressing the release button 21 down halfway contrast AF control is continuously carried out and the focus adjustment operation is executed continuously.

Also, if the release button 21 has been pressed down halfway, then after contrast AF control AE information is also read in, and metering is carried out based on this read in AE information. In this manner, contrast AF control is carried out, and metering values and calculated exposure values are updated. After pressing the release button 21 down halfway, the timing operation using the timer is not carried out, but there is no problem in performing control of timing for execution operation of the contrast AF control using a timer that expires in a shorter time than the timer of steps #52 and #59.

Also, in the case where single AF mode has been set, if the release button 21 has been pressed down halfway, then since before that the in-focus display was not activated, contrast AF control of step #105 is executed once only. If an in focus state is reached with this subroutine and the in-focus display is carried out, after that, as a result of determination in step #102 the contrast AF control of step #105 is not executed. Therefore, if an operation to press the release button 21 halfway is carried out focus (AF) lock is carried out.

Similarly, in the event that single AF mode has been set, if the release button 21 is pressed down halfway, reading in of AE information from the AE circuit 255 based on image data, and the metering and exposure amount calculation, in step #106 is carried out once only. If an in focus state is reached with this subroutine and the in-focus display is carried out, then after that, as a result of determination in step #102 the reading of AE information in step #106 is not executed. Therefore, if an operation to press the release button halfway is carried out AE lock is carried out. Evaluative metering takes place based on AE information read at the time of this AE lock.

Next it is determined if the release button 21 has been pressed down halfway, that is, if the 2R switch is on (#107). The processing after this is the same as for the first embodiment, and so detailed description will be omitted.

Next, a sub-routine for contrast. AF control of step #61 (FIG. 15) and step #105 (FIG. 17) will be described using FIG. 18. Steps #201 to #233 of the sub-routine for this contrast AF control are similar to the subroutine for the contrast AF control of FIG. 10 for the first embodiment, and so detailed description thereof is omitted.

In step #231, lens drive amount and drive direction are transmitted to the lens CPU 111, and upon receipt of the lens drive control instruction etc, the lens CPU 111 commences drive control for the optical system drive mechanism 107, and once drive is performed by a drive amount based on the second specified value a lens drive completion signal is transmitted to the body CPU 251. The body CPU 251 awaits receipt of the lens drive completion signal (#233), and if this completion signal is received it is determined whether or not continuous AF mode has been set (#234A).

If the result of determination in step #234A is that it is continuous AF mode, processing jumps to step #241, while if is not continuous AF mode the in-focus display is carried out (#235). This is in-focus display 311 on the display screen of the liquid crystal monitor 26, as shown in FIG. 13. Here, in the case of continuous AF mode, the fact that the in-focus display 311 is not displayed is because, similarly to turning off of the in-focus display in step #103, at the time of continuous AF mode focus adjustment is carried out continuously, and having the in-focus display flashing according to the in-focus state is visually undesirable.

A lens position information request is then instructed to the lens CPU 111 (#241). The lens CPU 111 acquires lens position information from the optical system position detection mechanism 105, and transmits this information to the body CPU 251. The body CPU 251 acquires the transmitted lens position information (#243). After that, the original routine is returned to.

As described above, in the second embodiment of the present invention, if continuous AF mode is set in the menu setting operation (#35), then at the time of starting a live view display operation (#51), with a state where the release button 21 has not been pressed down halfway (#53→No), each time a specified time (first time interval) has been reached by the timer (#57→Yes) a focus adjustment operation using contrast AD control is executed (#61), and if the release button 21 is pressed down halfway (#53→Yes) focus adjustment using contrast AF is executed continuously at an interval that is shorter than the specified time (second time interval) (#105). This second time interval can be measured using a timer, but with this embodiment a focus adjustment operation is carried out continuously without any particular timer operation.

Therefore, in the second embodiment of the present invention if continuous AF mode has been set the continuous AF control is carried out at a specified time interval determined by a timer until the release button 21 is pressed down halfway, and the focus adjustment operation is not carried out too frequently, and it is possible to prevent the live view display becoming unpleasant to look at. Also, since the interval for the focus adjustment operation after the release button 21 has been pressed down halfway becomes short, it is possible to make the timing short.

Next, a third embodiment of the present invention will be described using FIG. 19 to FIG. 23. With the first embodiment of the present invention, if the live view operation is started (refer to FIG. 4), in the case where continuous AF is selected automatic focus adjustment is carried out using contrast AF control (refer to step #61), and if the release button 21 is pressed down halfway (refer to step #53) automatic focus adjustment is carried out using contrast AF control (refer to step #102) until an in-focus state is reached. In this case, precision of the focus detection does not vary before and after the operation of pressing the release button 21 halfway down. In the second embodiment of the present invention, precision of the focus detection varied before and after the operation of pressing the release button 21 halfway down. Specifically, before pressing the release button 21 down halfway, the lens drive amount is a first or second specified value (step #204, #226), while after the release button 21 has been pressed down halfway the lens drive amount is a third or fourth specified value (step #206, #228).

Figure 6:
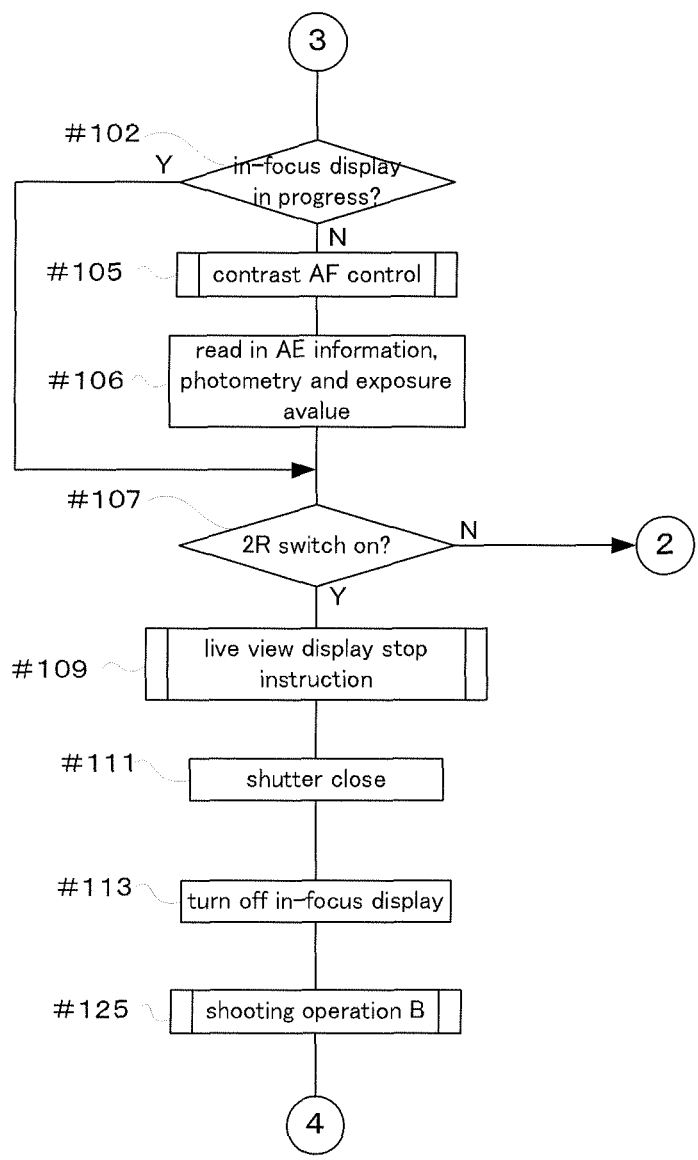
FIG. 6 is a flowchart showing a live view display operation of the first embodiment of the present invention.
Figure 10:
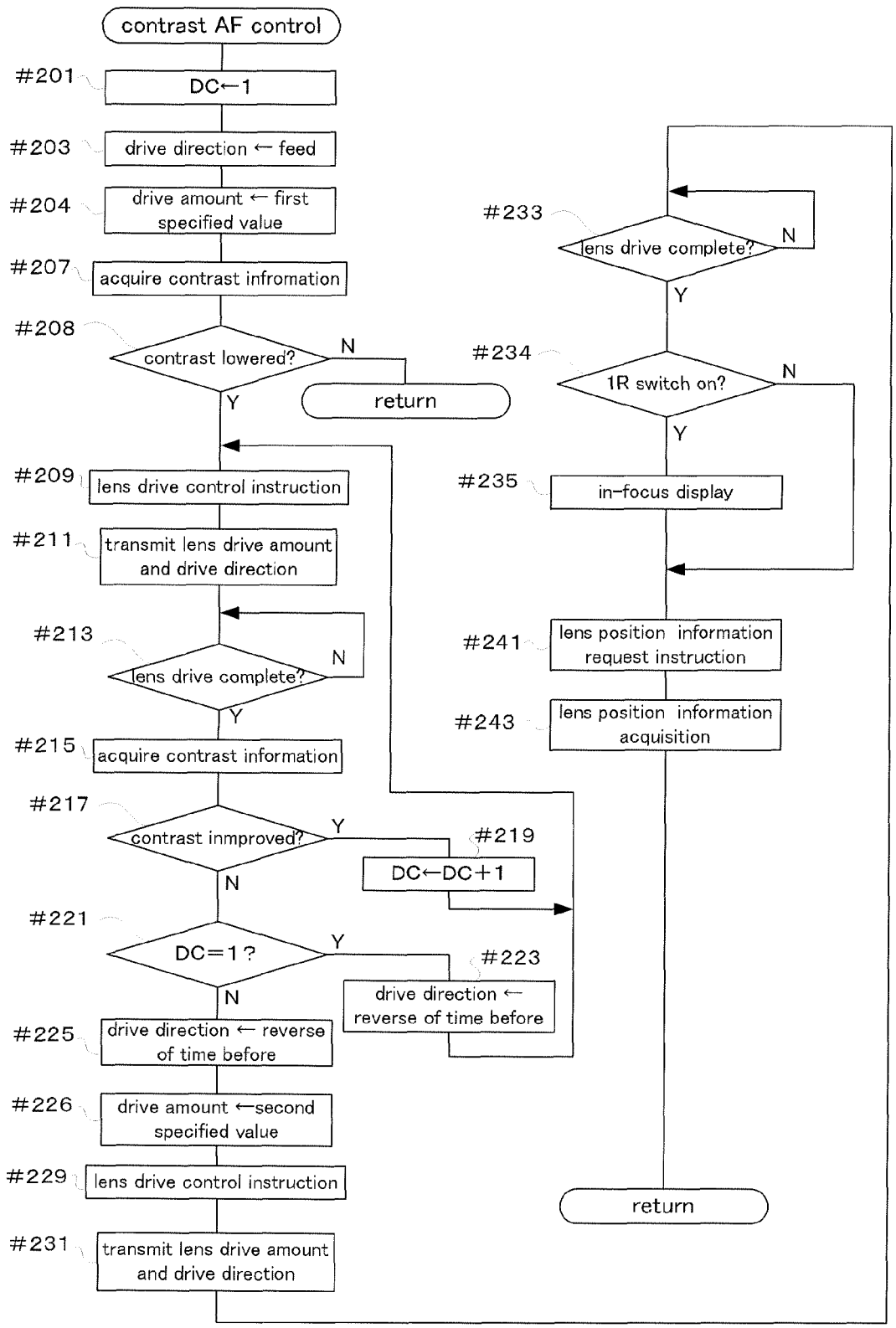
FIG. 10 is a flowchart showing contrast. AF control of the first embodiment of the present invention.
Figure 19:
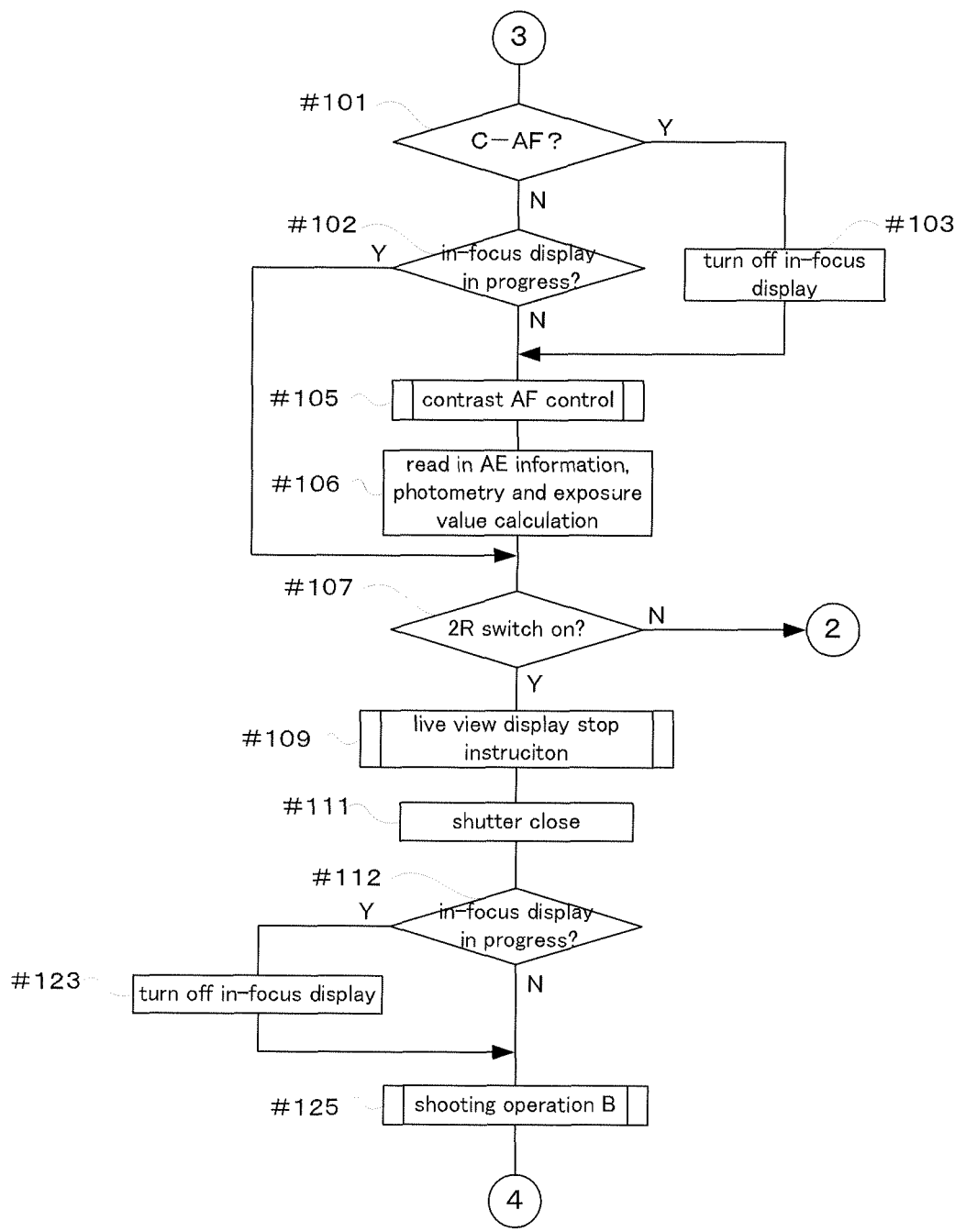
FIG. 19 is a flowchart showing a live view display operation of the third embodiment of the present invention.
Figure 20:
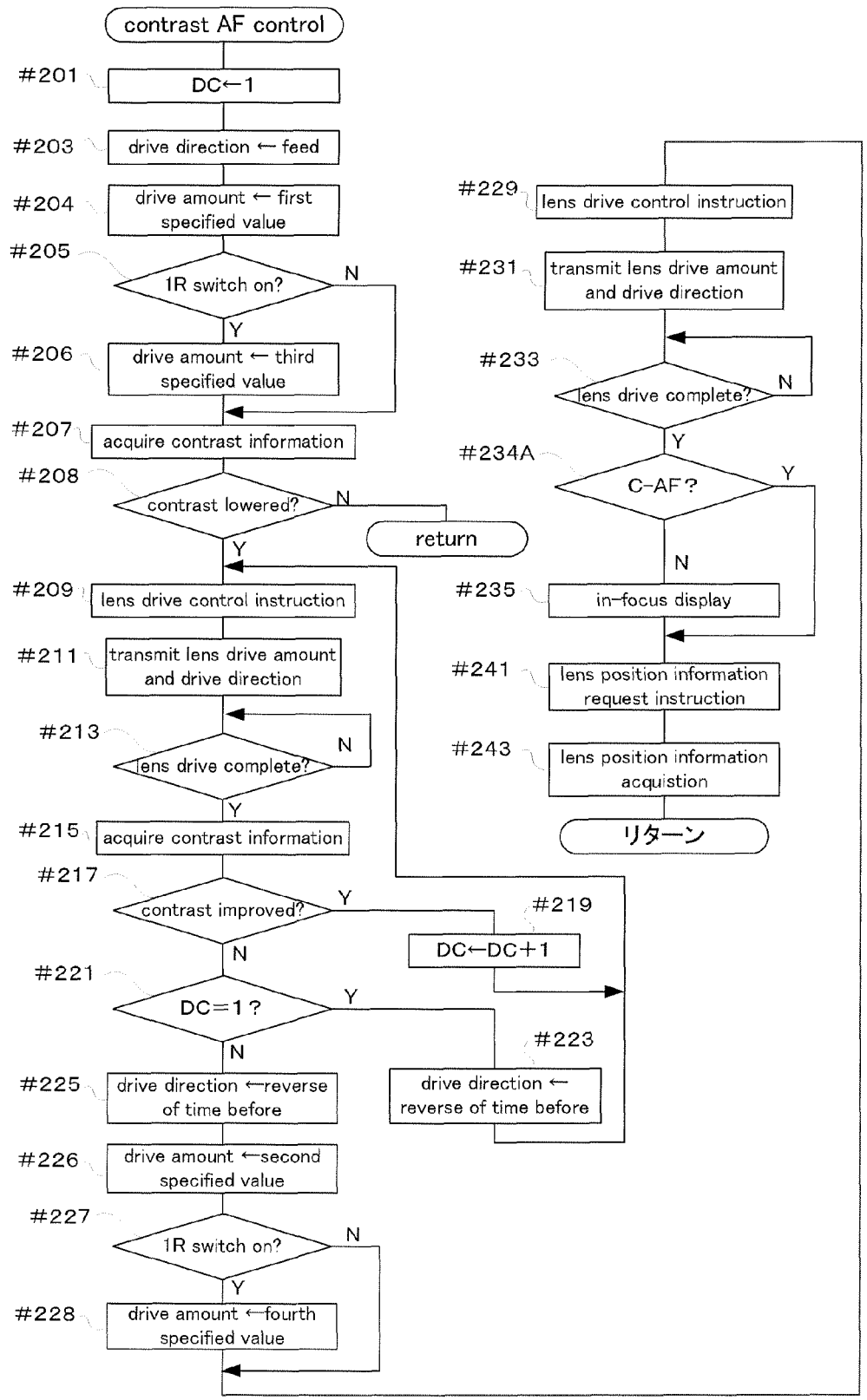
FIG. 20 is a flowchart showing contrast AF control of the third embodiment of the present invention.

The structure of the third embodiment is substantially the same as that of the first embodiment, and the flowcharts shown in FIG. 6, and FIG. 10 are replaced with the flowcharts of FIG. 19 and FIG. 20, with description centering on points of difference.

Figure 4:
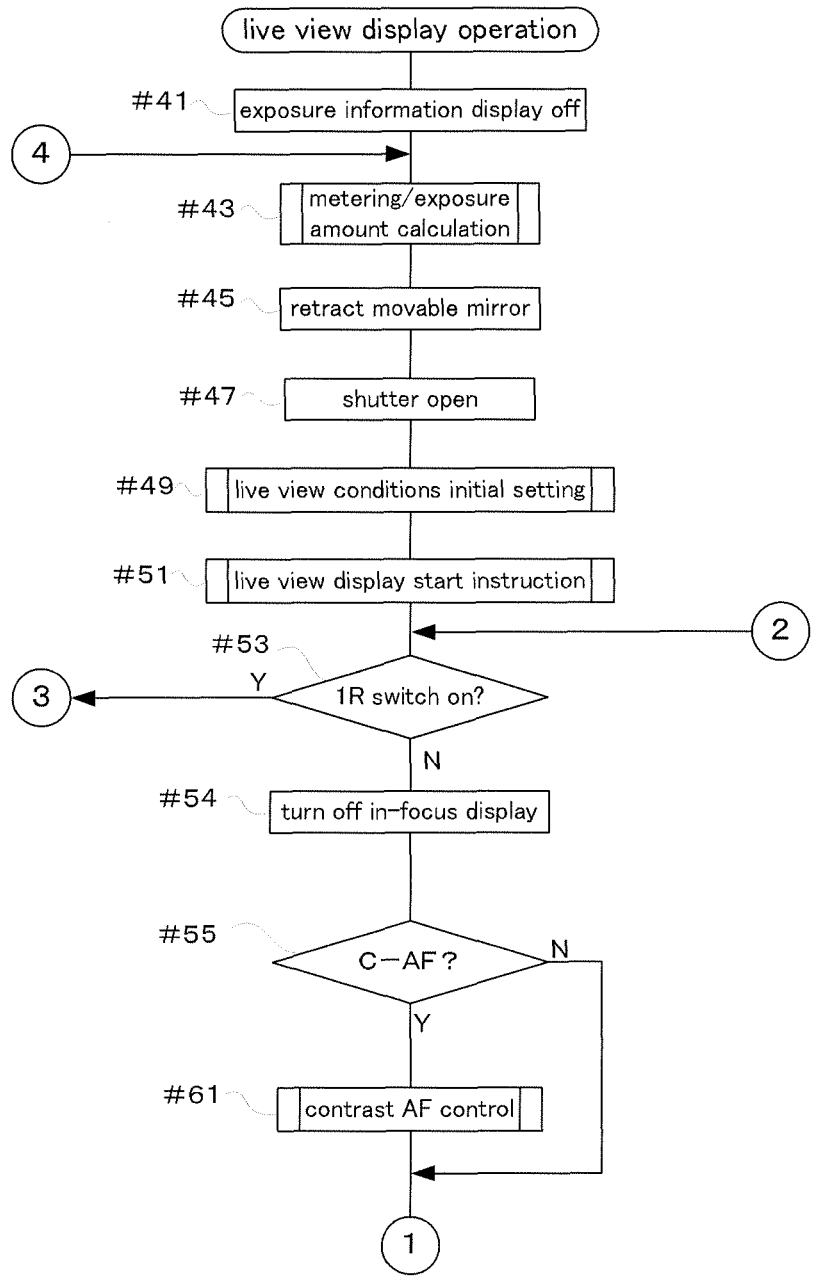
FIG. 4 is a flowchart showing a live view display operation of the first embodiment of the present invention.

If the subroutine of the live view display operation shown in FIG. 4 is entered, then as described above for the first embodiment, steps #4-#51 are executed and the live view display is started. Next, it is determined whether or not there has been an operation to press the release button 21 halfway down (#53), and if there has not been an operation to press the release button 21 down halfway, then after the in-focus display 311 is turned off (#54) it is determined whether or not continuous AF has been set (#55).

Figure 5:
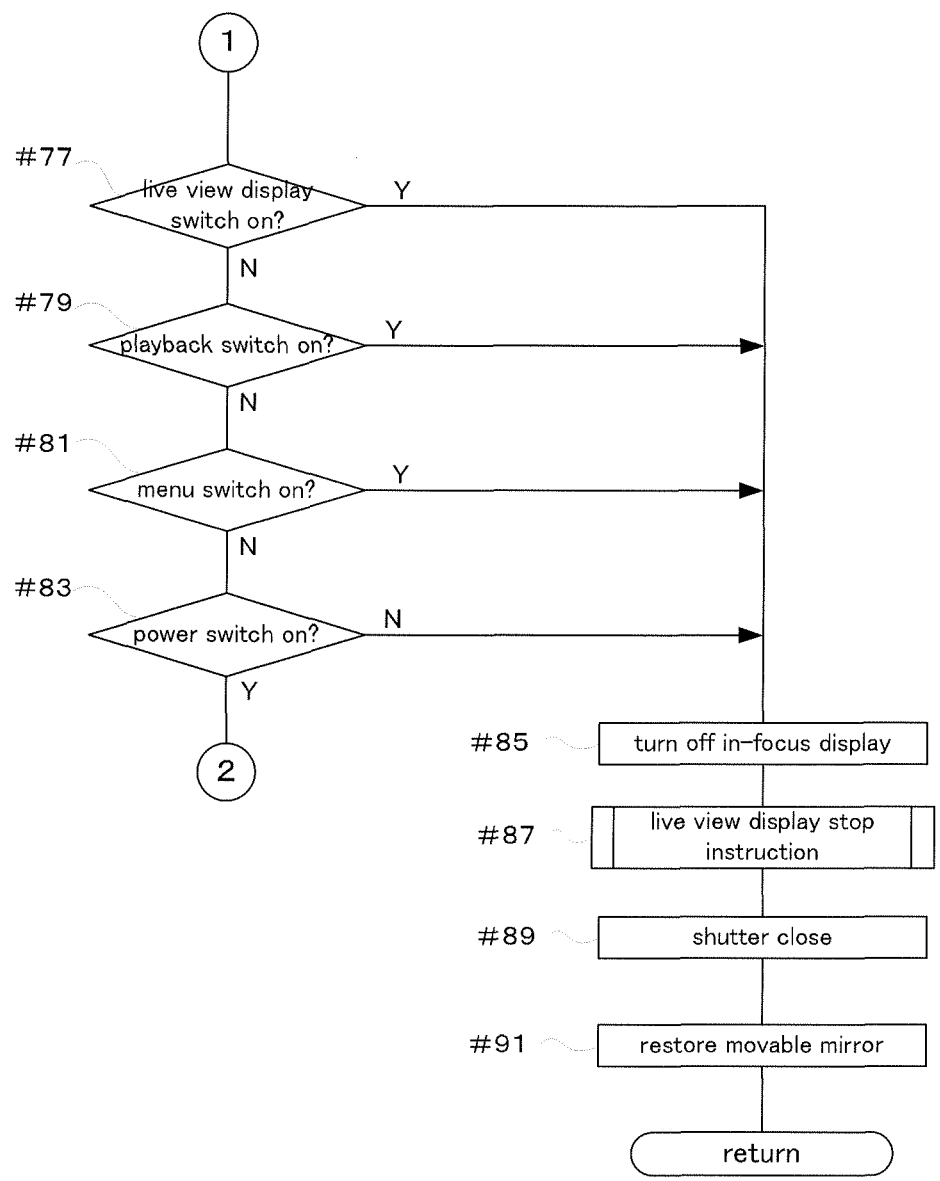
FIG. 5 is a flowchart showing a live view display operation of the first embodiment of the present invention.

If the result of determination in step #55 is that continuous AF control has not been set, processing advances to step #77 in FIG. 5, but if continuous AF control has been set continuous AF control is carried out (#61). The sub-routine for this continuous AF control will be described later using FIG. 20, but since this is before the release button 21 is pressed down halfway, focus adjustment is carried out with the first and second drive amounts.

If the result of determination in step #53 (FIG. 4) is that the 1R switch is on, processing advances to the flow shown in FIG. 19. From step #101 to #107 of this flow is the same as the second embodiment in that it has the addition of steps #101 and #103, and from step #109 to #125 of this flow is the same as the first embodiment except for the addition of steps #112 and #123. The duplicate steps will therefore be described simply, and description will center on points of difference.

If the flow of FIG. 19 is entered, it is determined whether or not continuous AF has been set as the AF mode. If the result of determination is that continuous AF mode has been set, then the in-focus display 311 is turned off (#103). In this embodiment also, as with the second embodiment, if continuous AF mode has been set, the in-focus display 311 is not displayed.

If the result of determination in step #101 is that continuous AF mode is not in effect, that is, in the case of single AF mode, it is next determined whether or not the in-focus display is in progress (#102). As has been described above, if the photographing optical system 101 is put in a focused state using contrast AF, the in-focus display 311 is brought into effect. After a focused state has been reached with single AF mode, since it is not necessary to carry out contrast AF again in step #105, if the result of determination in step #102 is that the in-focus display is in progress, that is, that an in focus state has been reached, there is a jump to step #107, and steps #105 and #106 are skipped.

If the result of determination in step #102 is that the in-focus display is not in progress, or if turning off of the in-focus display in continuous AF mode has been completed, contrast AF control is carried out (#105). Accordingly, in the event that single AF mode has been set, then when the release button 21 is pressed down halfway, that is the 1R switch is on, focus adjustment is carried out once using contrast AF control, and if an in-focus state is subsequently reached, the contrast AF control of step #105 is subsequently skipped.

Also, in the event that continuous AF mode has been set, before the release button 21 is pressed down halfway, that is when the 1R switch is off, step #53→step #59→step #83→step #53 are repeatedly executed, and contrast AF control of step #59 is repeatedly executed. Also, if the 1R switch becomes on, step #53→#101→step #103→step #105→step #107→step #53 are repeatedly executed to repeatedly execute the contrast AF control of step #105.

The contrast AF control of step #105 will be described later using FIG. 20, but since it is after the release button 21 has been pressed down halfway, focus adjustment is carried out with the third and fourth drive amounts, and high precision focus adjustment is carried out using the contrast AF control of previously described step #61.

If contrast AF control of step #105 is completed, AE information is read in (#106).

If continuous AF mode has been set, step #101 branches at Yes, and AE information can be read in every time in step #106. In the event that single AF mode has been set (#101→No), the AE information can only be read in step #106 in the event that it is determined that in-focus display is not in progress in step #102. Specifically, in the case where single AF mode has been set, when the release button 21 is pressed down halfway (the 1R switch is on), reading in of AE information is carried out only once.

Next it is determined if the release button 21 has been pressed down fully, that is, if the 2R switch is on (#107). If the result of determination is that the 2R switch is not on (that is, it is off), processing returns to step #53 and the operations described above are repeated. On the other hand, if the 2R switch is on, a shooting operation is executed in steps #109 and after.

If the shooting operation is entered, first live view display is stopped (#109). Next, the shutter 213 is closed (#111). During live view display, the shutter 213 is opened, and a subject image is displayed on the liquid crystal monitor 26 based on output of the image sensor 211, but the shutter 213 is temporarily closed in order to enter the shooting operation.

It is next determined whether or the in-focus display is being carried out (#112). If the result of determination is that the in-focus display is in progress, the in-focus display is turned off before a shooting operation (#123). If the result of determination is that in-focus display is not in progress, or the turning off of the in-focus display in step #123 is completed, then a shooting operation B is carried out to acquire and store image data for a still image based on the subject image (#125). If the shooting operation B is completed, processing returns to step #43, live view display is resumed, and the operations described above are repeated.

Next, a sub-routine for contrast AF control of step #59 (FIG. 4) and step #105 (FIG. 19) will be described using FIG. 20. In this contrast AF control flow, steps for carrying out the same processing as in the flow shown in FIG. 10 have the same reference numerals assigned, and detailed description is omitted. Contrast AF control is performing drive of the photographing optical system 101 so that contrast information of the contrast AF circuit 253 becomes maximum based on output of the image sensor 221.

In this contrast AF control, there are two modes, namely high speed contrast AF (first contrast AF) that carries out AF control at high speed but with first focus precision of rough focus precision, and high precision AF (second contrast AF) that carries out AF control at low speed but with a second focus precision that is high focus precision.

If the contrast AF control subroutine is entered, first contrast AF commences, and first of all a register DC is set to 1 (#201). This register. DC is a register that is used in order to determine drive direction for the lens drive. Next, the lens feed direction is set as the drive direction (#203). A second specified value is then set as a lens drive amount (#204). This first specified value is equivalent to focus lens feed amount LD1, in FIG. 21A, and is an amount relating to a defocus amount $\Delta f$ LCD corresponding to the diameter $\phi$LCD of a permissible circle of confusion for the liquid crystal monitor in FIG. 23.

Next, it is determined whether or not the release button 21 has been pressed down halfway, that is, whether or not the 1R switch is on (#205). If the result of determination is that the 1R switch is off there is a jump to step #207, while if the 1R switch is on a third specified value is set as the drive amount (#206) and second contrast AF mode is switched to. This third specified value is equivalent to focus lens feed amount. LD3 in FIG. 21B, and is an amount relating to a defocus amount $\Delta$ f img corresponding to the diameter $\phi$img of a permissible circle of confusion for imaging surface of the image sensor 211 in FIG. 23.

Here, before the 1R switch is turned on, that is, before the release button 21 is pressed down halfway, changing the drive amount according to the state of the 1R switch can be at a sufficient focus precision for viewing the subject image when displayed on the liquid crystal monitor 26. However, if the release button 21 is pressed down halfway to give a shooting preparation state, there is a high possibility of the release button being pressed down fully and a shooting operation carried out shortly after that, and so it is necessary to have sufficient focus precision on the imaging surface of the image sensor 22. If the release button 21 is pressed down halfway, the drive amount is changed from the first specified value to the third specified value (first contrast AF→second contrast AF), and it is possible to maintain a high level of focusing precision.

Next, contrast information is acquired from the contrast. AF circuit 153 (#207). In step #207 to step #221, similarly to the flow of the first embodiment shown in FIG. 10, focus adjustment of the photographing system 101 is carried out with the set drive amount set (in this embodiment, setting of step #204 or, step #206). In step #221, if passing of peak positions of contrast is detected, drive direction is set to the opposite of the direction previously (#225).

Figure 21A:
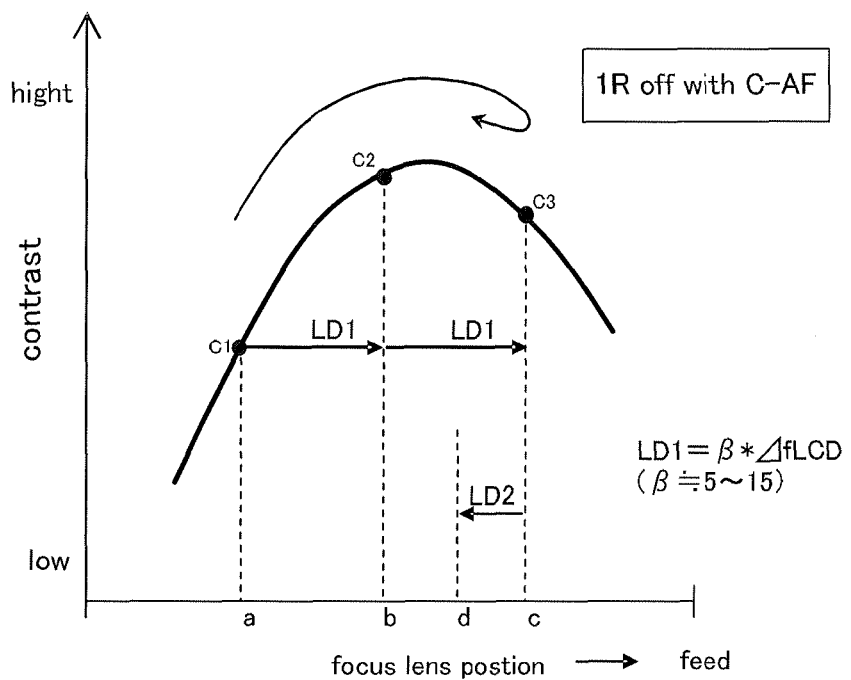
FIG. 21A and FIG. 21B are drawings showing a relationship between contrast information and focus lens drive for a third embodiment of the present invention, with FIG. 21A showing the case of high speed contrast AF, and FIG. 21B showing the case of high precision contrast AF.

If drive direction is set to the opposite direction, the second specified value is then set as the lens drive amount (#226). The second specified value (corresponding to focus lens feed amount LD2) for the lens drive amount is equivalent to half the feed amount LD1 of the focus lens, as shown in FIG. 21A. Since the peak contrast position has been passed, it is assumed that the peak position is somewhere between this time and the previous time, and the first specified value is halved.

Figure 21B:
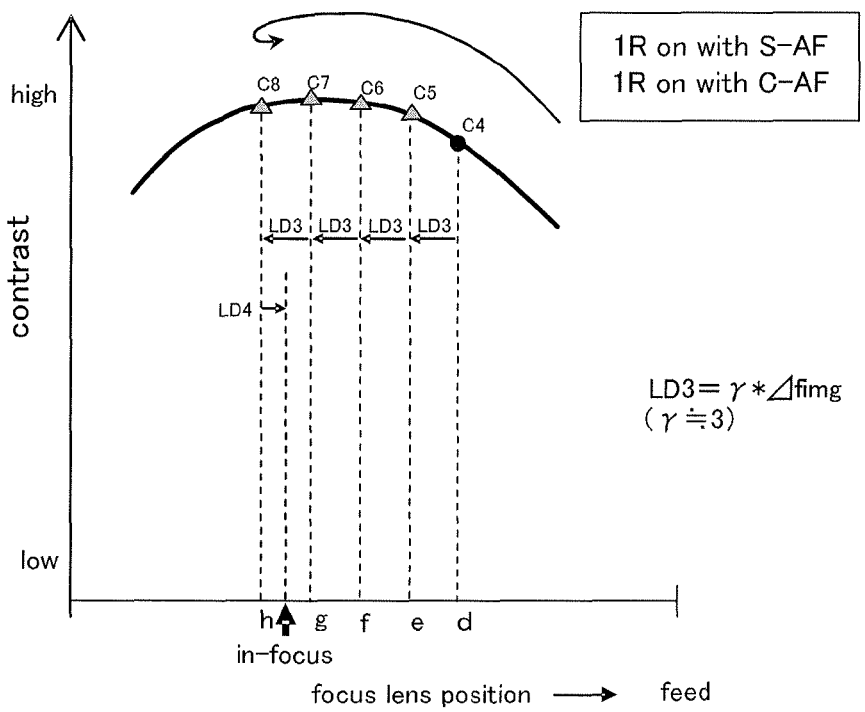

It is next determined whether or not the 1R switch is on (#227). If the result of determination is that the 1R switch is off there is a jump to step #229, while if the 1R switch is on a fourth specified value is set as the drive amount (#228) and second contrast AF mode is switched to. The fourth specified value (corresponding to focus lens feed amount LD4) for the lens drive amount is equivalent to half the feed amount LD3 of the focus lens, as shown in FIG. 21B. Since the peak contrast position has been passed, it is assumed that the peak position is somewhere between this time and the previous time, and the third specified value is halved.

Similarly to the case of step #205, before the release button 21 has been pressed down halfway sufficient focusing precision is maintained to observe the subject image when displayed on the liquid crystal monitor 26, while when the release button 21 has been pressed down halfway to give a shooting preparation state the drive amount is changed from the second specified value to the fourth specified value (first contrast. AF→second contrast AF) so as to maintain a sufficiently high degree of focusing precision on the imaging surface of the image sensor 221, and it is possible to ensure a high degree of focusing precision.

Lens drive control is then instructed to the lens CPU 111 (#229), and the lens drive direction that was set in step #225 and drive amount and lens drive direction that were set in step #226 or step #228 are transmitted (#231).

Upon receipt of the lens drive control instruction etc, the lens CPU 111 commences drive control for the optical system drive mechanism 107, and once drive is performed by a drive amount based on the second specified value a lens drive completion signal is transmitted to the body CPU 251. The body CPU 251 awaits receipt of the lens drive completion signal (#233), and if this completion signal is received it is determined whether or not continuous AF mode has been set (#234A).

If the result of determination in step #234A is that it is continuous AF mode, processing jumps to step #241, while if is not continuous AF mode the in-focus display is carried out (#235). This is in-focus display 311 on the display screen of the liquid crystal monitor 26, as shown in FIG. 13. Here, in the case of continuous AF mode, the fact that the in-focus display 311 is not displayed is because, similarly to turning off of the in-focus display in step #103, at the time continuous AF mode focus adjustment is carried out continuously, and having the in-focus display flashing according to the in-focus state is visually undesirable.

In the case of single AF mode, the in-focus display 311 is displayed. This state is a focus state where out of focus blur is at a level that is difficult to notice, if a subject image is confirmed on the liquid crystal monitor 26, even if it is insufficient for photographing, and this in-focus permissible range is set using diameter of a permissible circle of confusion based on display resolution of the liquid crystal monitor 26, that is, the display dot size of the liquid crystal monitor 26. Therefore, sufficient focus precision is achieved to monitor the subject image on the liquid crystal monitor 26.

A lens position information request is then instructed to the lens CPU 111 (#241). The lens CPU 111 acquires lens position information from the optical system position detection mechanism 105, and transmits this information to the body CPU 251. The body CPU 251 acquires the transmitted lens position information (#243). After that, the original routine is returned to.

Figure 22A:
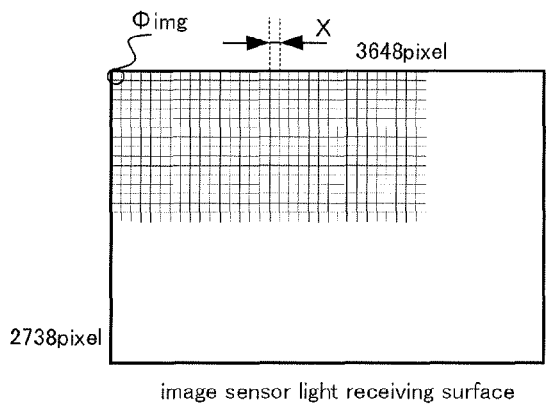
FIGS. 22A and 22B are drawings for describing the diameter of a permissible circle of confusion of an image sensor and a liquid crystal monitor of the third embodiment of the present invention, with FIG. 22A showing the diameter of permissible circle of confusion for an image sensor, and FIG. 22B showing the diameter of permissible circle of confusion fir the liquid crystal monitor.
Figure 22B:
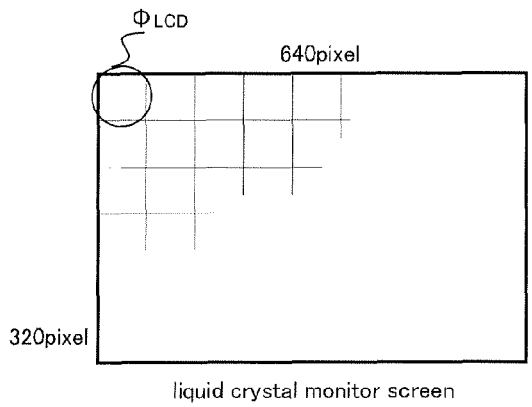
Figure 23:
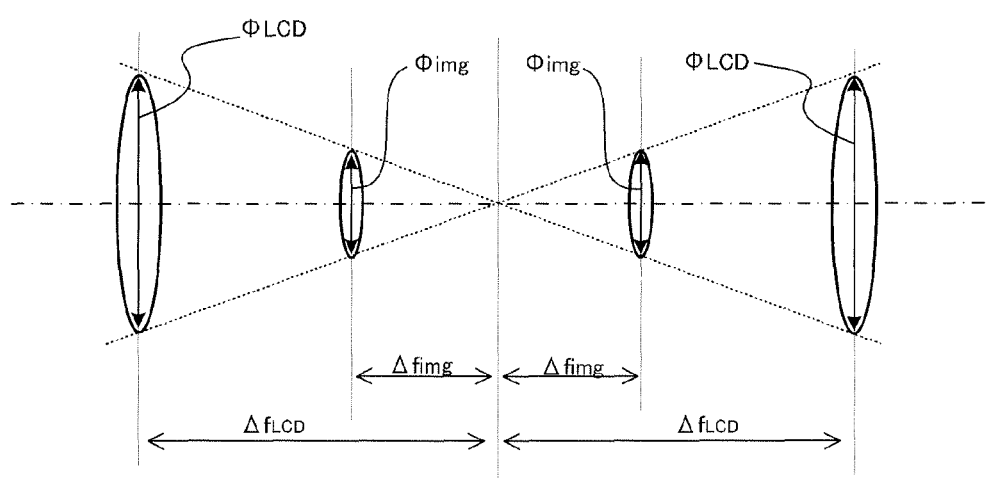
FIG. 23 is a drawing showing a relationship between diameter of permissible circle of confusion and defocus amount of the third embodiment of the present invention.

Next, focus precision for contrast AF of this embodiment will be described using FIG. 21A to FIG. 23. As shown in FIG. 22A the imaging surface of the image sensor 221 is made up of 3648 pixels in the horizontal direction by 2738 pixels in the vertical direction. On the other hand, if the liquid crystal monitor screen of the liquid crystal monitor 26 is formed from 640 horizontal pixels by 320 vertical pixels, as shown in FIG. 22B, then compared to the image sensor 221 the diameter of the permissible circle of confusion is about 1/7, and even if a LPF coefficient is considered is about 1/4, which means that the diameter $\varphi$LCD of the permissible circle of confusion of the liquid crystal monitor 26 becomes:

$$\varphi LCD = (3648/640) * \varphi\, img / \alpha$$

$$\approx 4 * \varphi\, img$$

A permissible defocus amount $\Delta f$ LCD for the liquid crystal monitor, equivalent to permissible circle of confusion diameter $\varphi$LCD of the liquid crystal monitor 26 is thus:

$$\Delta fLCD = \varphi LCD / F$$

and here, F is lens aperture value (F number) F=D/f (D is opening diameter, f is focal distance)

Accordingly, focusing precision for the first focusing display (#235) in the case where first contrast AF mode is in effect, has a drive amount set to a first specified value, and if, as shown in FIG. 21A, $\beta * \Delta f$ LCD is adopted as the first specified value, it is possible to obtain a degree of focusing precision about that of the permissible circle of confusion diameter $\varphi$LCD of the liquid crystal monitor 26. Here, $\beta \approx 5-15$ ($\beta$ is an empirical value).

On the other hand, as shown in FIG. 22A, the imaging surface (light receiving surface) of the image sensor 221 is made up of 3648 horizontal pixels by 2838 vertical pixels. The permissible circle of confusion diameter $\varphi$img of this image sensor 221 is $$\varphi img = \alpha * X$$

and here, $\alpha$ is LPF coefficient (=1.5–2) X is sensor size

The LPF coefficient is a coefficient due to the effect of the infrared cut/low pass filter 217, and so the permissible circle of confusion diameter $\varphi$img of the image sensor is obtained by multiplying the pixel size of the image sensor by a coefficient that takes into consideration the low pass filter.

The permissible defocus amount $\Delta f$ img for imaging equivalent to the permissible circle of confusion diameter $\varphi$img of the image sensor 221 is therefore:

$$\Delta f img = \varphi img / F$$

and here, F is lens aperture value (f number) F=D/f (D is opening diameter, f is focal distance)

Accordingly, focusing precision for the focusing display (#235) for the case where second contrast AF mode is in effect, has a drive amount set to a second specified value, and if, as shown in FIG. 21B, $\gamma * \Delta f$ img is adopted as the second specified value, it is possible to obtain a degree of focusing precision about that of the permissible circle of confusion diameter $\varphi$img of the image sensor 221. Here, $\gamma \approx 3$ ($\gamma$ is an empirical value). The number of pixels individually explained is an example, and it is possible to determine the permissible circle of confusion diameter, defocus amount and drive amount according to design values of this imaging device. The in-focus permissible range for phase difference AF is also determined based on Δ f img.

As has been described above, with the third embodiment of the present invention, when continuous AF mode has been set, if a live view display operation is commenced (#51) the contrast AF control is repeatedly executed (refer to #61 in FIG. 4). Even if an operation to press down the release button 21 halfway is performed, the contrast AF control is repeatedly executed using continuous AF mode (refer to #105 in FIG. 19) and at this time the focus precision is switched (#205 and #106 in FIG. 20). In this manner, by switching focusing precision before and after pressing the release button 21 down halfway, when shooting in the live preview display state time lag is reduced, and it becomes possible to carry out high precision focus adjustment.

Also, in the third embodiment of the present invention, there are a first contrast AF mode where the photographing optical system 101 is guided to within a first permissible focus range, and a second contrast AF mode where the photographing optical system 101 is guided to within a second permissible focus range that is narrower than the first permissible focus range, and switching of the focus precision before and after pressing the release button 21 down halfway is carried out by switching from first contrast AF mode to second contrast AF mode. As a result, before pressing the release button 21 down halfway a sufficient focused state to carry out live view display on the liquid crystal monitor 26 is reached, and after pressing the release button 21 down halfway it is possible to ensure a sufficient degree of focusing precision for imaging on the image sensor 221. Also, since a tentative sufficiently focused state is reached before pressing the release button down halfway, after the release button 21 is pressed down halfway it is possible to reach the high precision focus with second AF contrast mode rapidly, and it becomes possible to carry out high precision focus adjustment.

Each of the embodiments of the present invention has been described above, but in each embodiment whether or not the focused state is reached is determined on the basis of whether or not the in focus display (#235) is active, but there is no problem in determining whether or not the focused state has been reached using a method such as determining whether or not a flag is set. Also, in each embodiment AF modes of single AF and continuous AF are set in a menu mode, but this is not limiting and it is also possible to provide a dedicated operation member or to be able to set the AF mode together with shooting mode etc.

Also, each of the embodiments has been described as an example applied to a single lens reflex type of digital camera, but there is no problem with the camera being a so called compact camera or being a camera of the type incorporated into a mobile telephone or PDA (mobile information terminal: Personal Digital Assistant). In any event, it is possible to apply the present invention to an electronic imaging device such as a camera for performing a live view display, and capable of adjusting focus using contrast AF control.

Description has been given above of the embodiments of the present invention, but the present invention is not limited to these embodiment, and structural elements may be modified in actual implementation within the scope of the gist of the embodiments. It is also possible form various inventions by suitably combining the plurality structural elements disclosed in each of the above describe embodiments. For example, it is possible to omit some of the structural elements shown in the embodiments. It is also possible to suitably combine structural elements from different embodiments.

What is claimed is:

1. An imaging device, comprising:
    an imaging section for receiving subject light flux made incident by a photographing lens on an image forming surface, and subjecting the subject image on the imaging surface to photoelectric conversion to output subject image data;
    a display section for carrying out a live view display operation using image data acquired by the imaging section;
    a first contrast AF section for obtaining contrast information of a subject image from the image data acquired by the imaging section, and guiding the photographing lens into a first in-focus permissible range based on the contrast information;
    a control section for, if the live view display operation has commenced, performing control so that a focus adjustment operation is executed using the first contrast AF section at a first time interval; and
    a release button having a two stage operating feature, of a half pressed operation and a fully pressed operation;
    wherein the control section performs control so as to continuously repeat execution of a focus adjustment operation using the first contrast AF section at a second time interval that is shorter than the first time interval, if the release button has been pressed down halfway.

2. The imaging device of claim 1, further comprising:
    an AE information section for acquiring brightness information for exposure control, based on the image data output from the imaging section and wherein
    the brightness information is acquired every time a focus adjustment operation is carried out using the first contrast AE section.

3. A control method for an imaging device for imaging a subject, comprising:
    imaging a subject;
    subjecting a formed subject image to live view display;
    guiding the photographing lens into a first focus range at a first time interval based on contrast information of the subject if the live view display operation has been started; and
    guiding the photographing lens into the first focus range at a second time interval that is shorter than the first time interval, based on contrast information of the subject, if the release button has been pressed down halfway, wherein the guiding in the second time interval is continuously repeated.

4. The control method for an imaging device of claim 3, wherein:
    brightness information for the subject image is acquired every time the photographing lens is guided into a first in-focus permissible range.

5. A non-transitory computer readable storage medium storing a program for realizing, in an imaging device for shooting a subject image, the following functions, comprising:
    imaging a subject;
    subjecting a formed subject image to live view display;
    guiding the photographing lens into a first focus range at a first time interval based on contrast information of the subject if the live view display operation has been started; and
    guiding the photographing lens into the first focus range at a second time interval that is shorter than the first time interval, based on contrast information of the subject, if the release button has been pressed down halfway, wherein the guiding in the second time interval is continuously repeated.

* * * * *